Aug. 21, 1962     P. M. G. TOULON     3,050,654
IMPROVEMENTS IN LIGHT SOURCE CONTROL AND MODULATION
Original Filed May 13, 1955     10 Sheets-Sheet 1
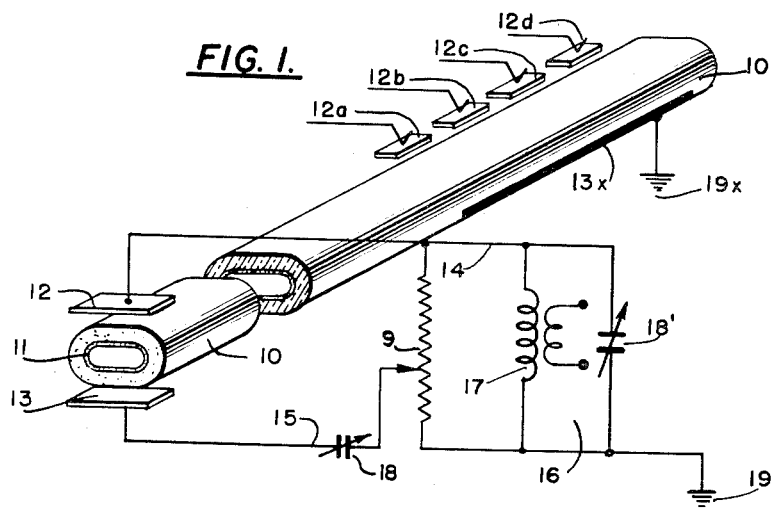
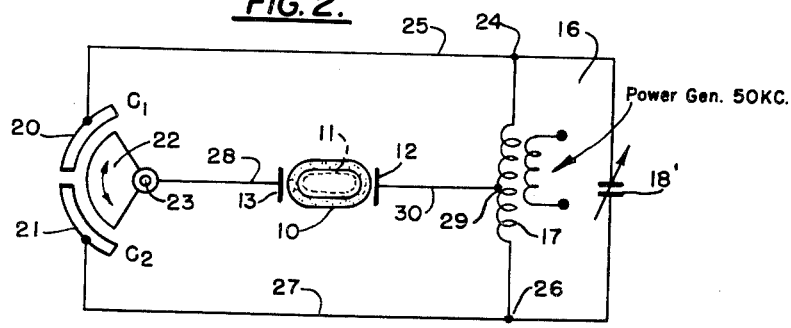
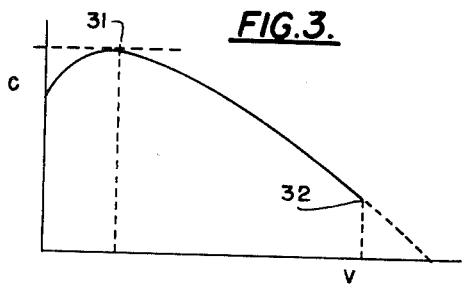
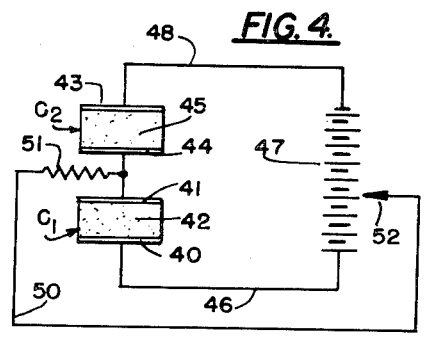
INVENTOR
PIERRE M. G. TOULON
BY
ATTORNEYS

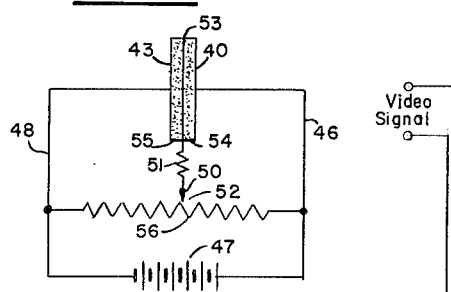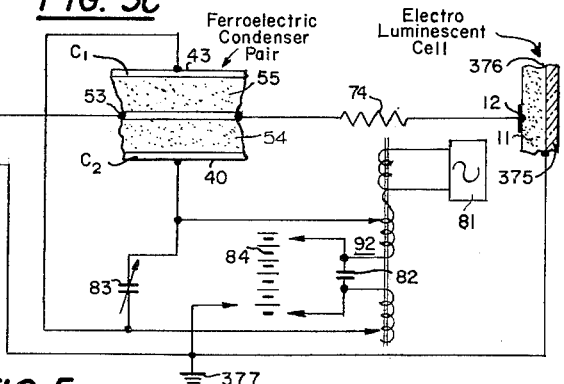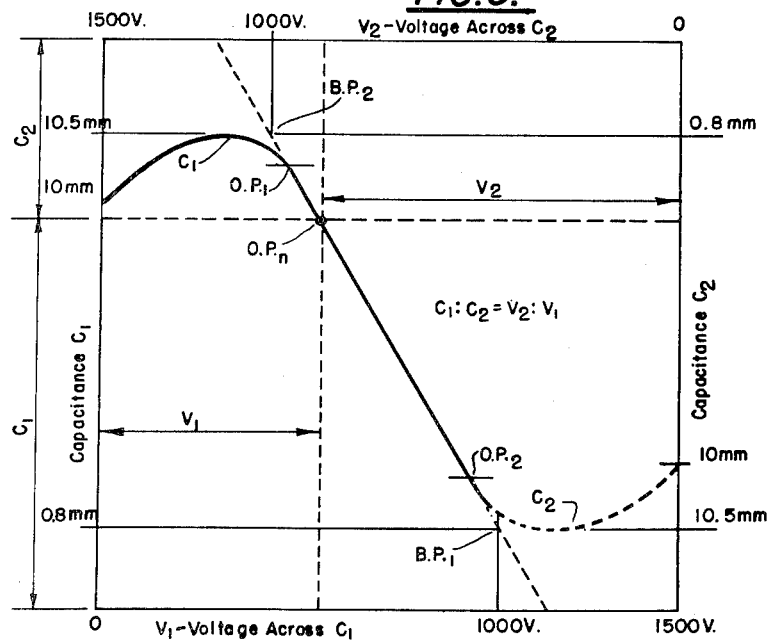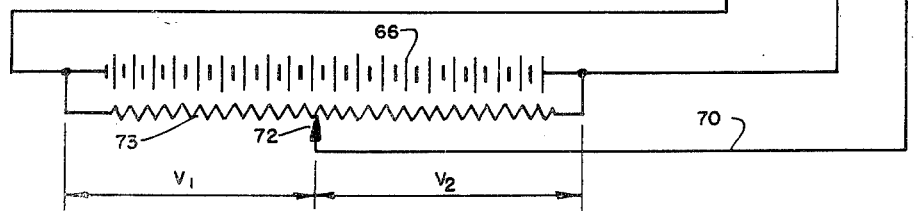

Aug. 21, 1962 P. M. G. TOULON 3,050,654
IMPROVEMENTS IN LIGHT SOURCE CONTROL AND MODULATION
Original Filed May 13, 1955 10 Sheets-Sheet 3

INVENTOR
PIERRE M. G. TOULON
BY
ATTORNEYS

Aug. 21, 1962                P. M. G. TOULON                3,050,654
                 IMPROVEMENTS IN LIGHT SOURCE CONTROL AND MODULATION
Original Filed May 13, 1955                                 10 Sheets-Sheet 4
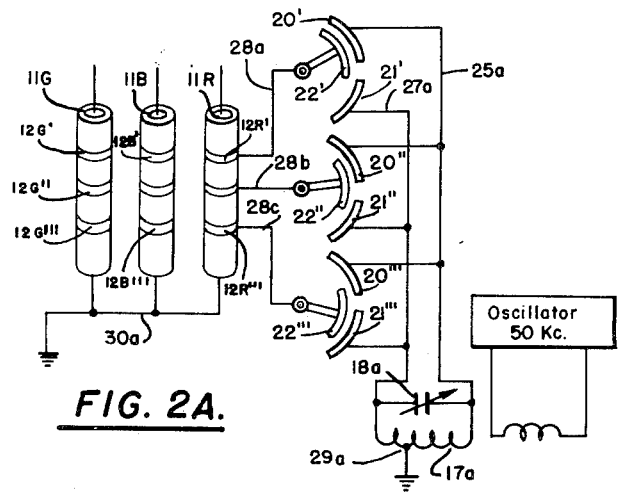
*FIG. 2A.*
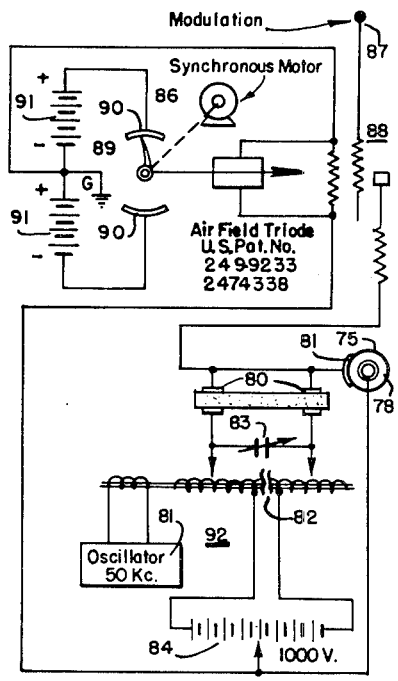
*FIG. 7.*
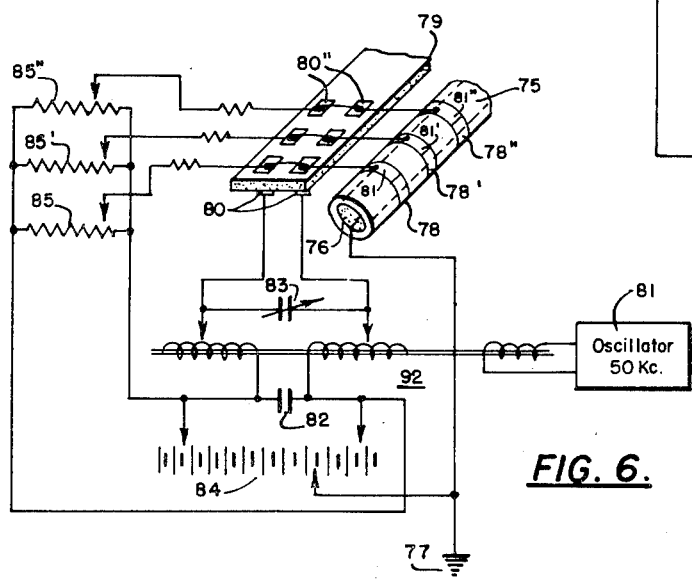
*FIG. 6.*
*FIG. 13B.*
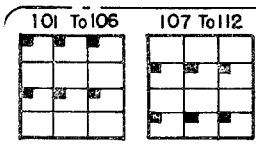 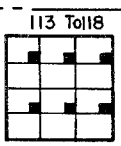 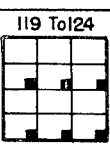 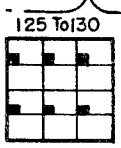 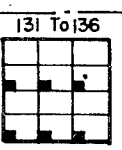 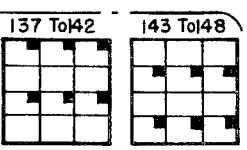
| 101 To 106 | 107 To 112 | 113 To 118 | 119 To 124 | 125 To 130 | 131 To 136 | 137 To 142 | 143 To 148 |
INVENTOR
PIERRE M. G. TOULON
BY  *Moore & Hall*
ATTORNEYS INVENTOR
PIERRE M.G.TOULON
BY Moore & Hall
ATTORNEYS

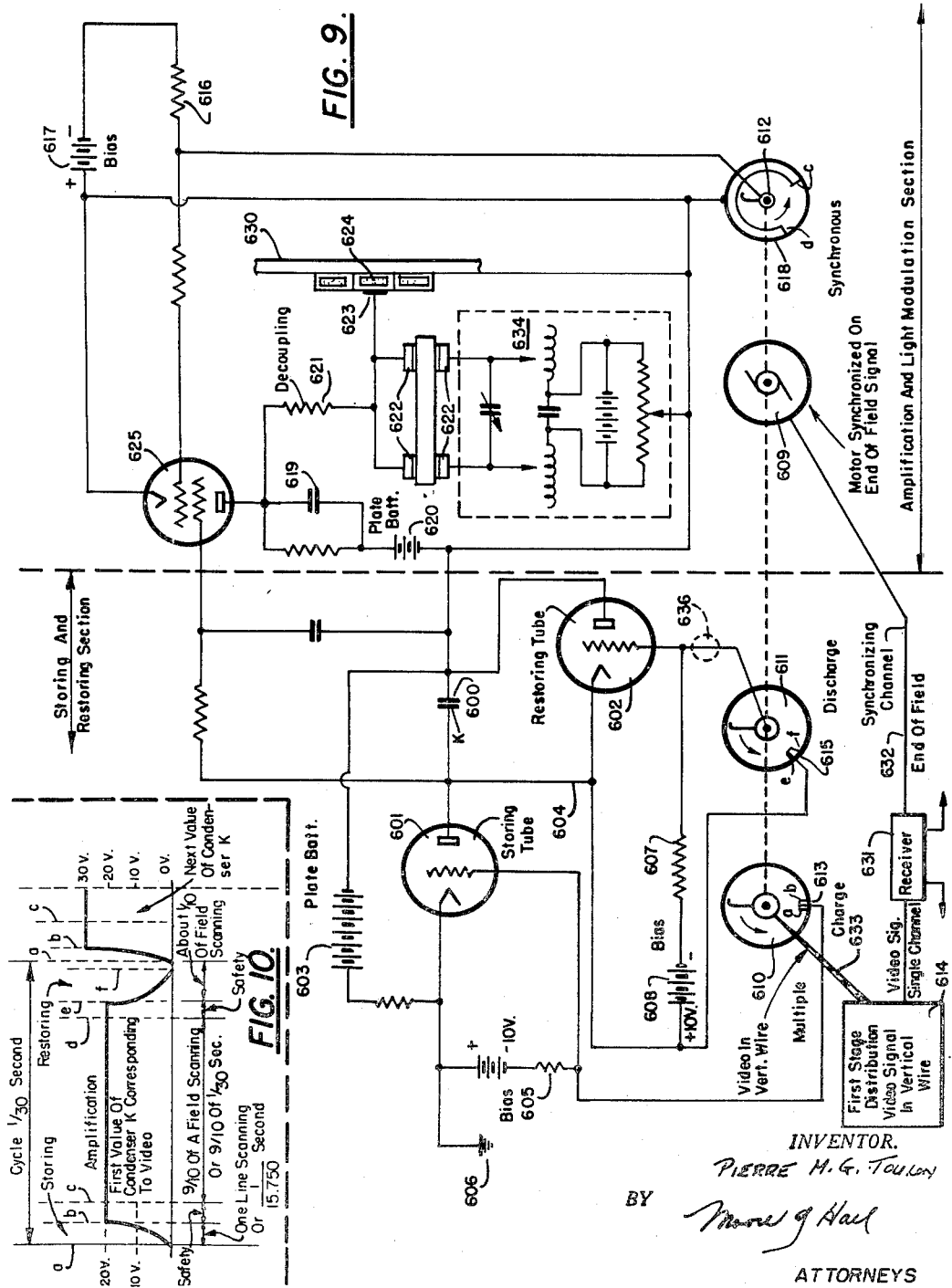

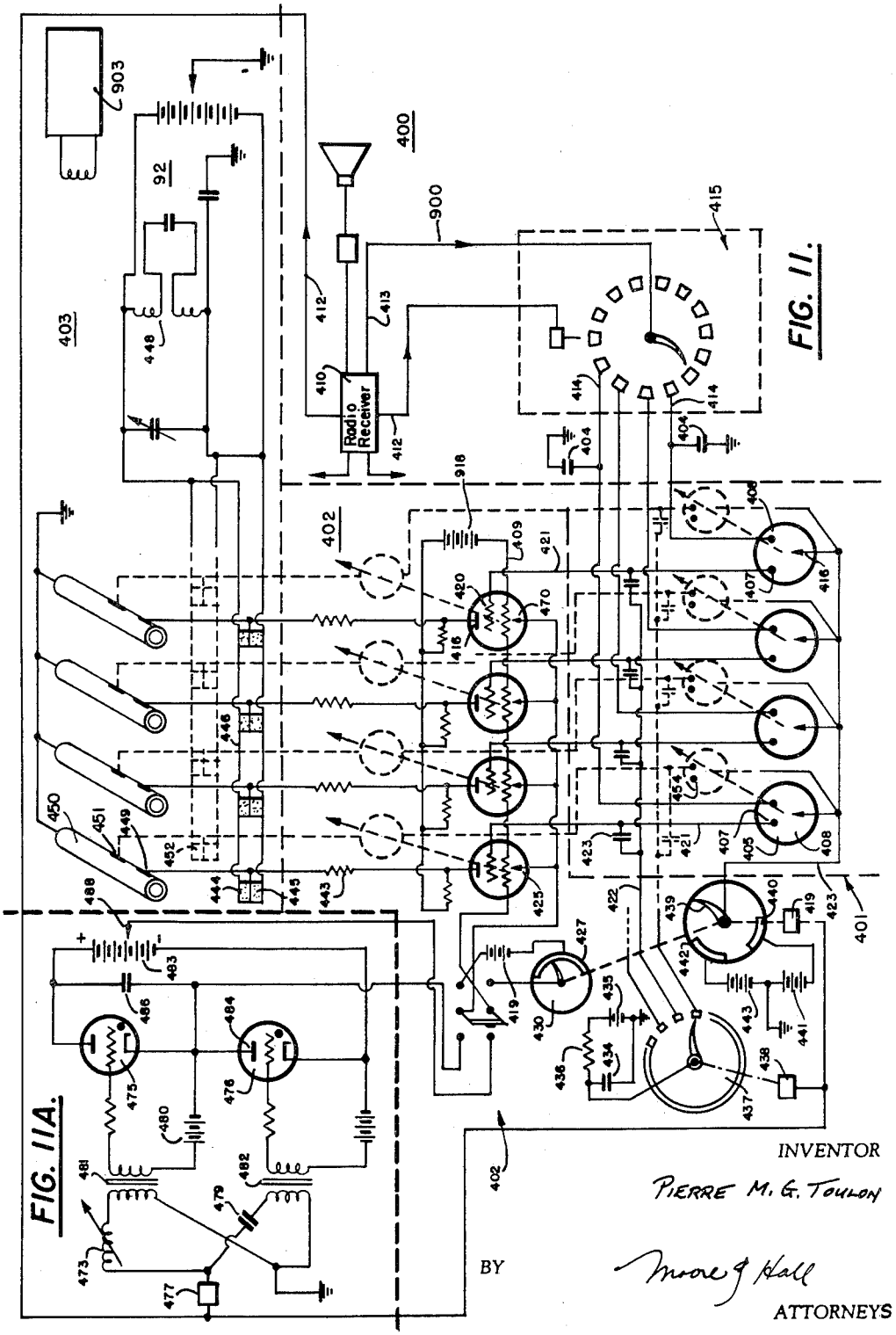
Aug. 21, 1962  P. M. G. TOULON  3,050,654
IMPROVEMENTS IN LIGHT SOURCE CONTROL AND MODULATION
Original Filed May 13, 1955  10 Sheets-Sheet 7
INVENTOR
PIERRE M. G. TOULON
BY Moore & Hall
ATTORNEYS

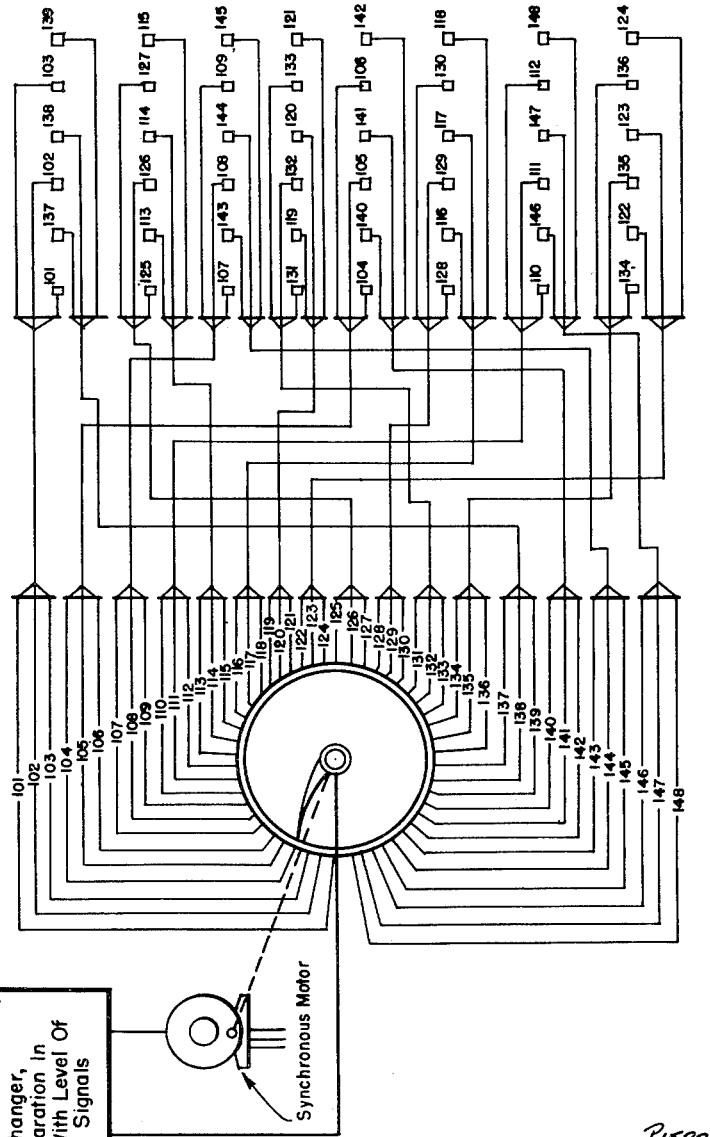

Aug. 21, 1962 P. M. G. TOULON 3,050,654
IMPROVEMENTS IN LIGHT SOURCE CONTROL AND MODULATION
Original Filed May 13, 1955 10 Sheets-Sheet 10

INVENTOR
PIERRE M. G. TOULON
BY
ATTORNEYS

United States Patent Office 3,050,654
Patented Aug. 21, 1962

3,050,654
IMPROVEMENTS IN LIGHT SOURCE CONTROL
AND MODULATION
Pierre Marie Gabriel Toulon, Pittsburgh, Pa., assignor to
Moore & Hall, Washington, D.C., a firm
Continuation of application Ser. No. 508,144, May 13,
1955. This application Nov. 6, 1957, Ser. No. 694,869
21 Claims. (Cl. 313—108)

This application is a continuation of my copending application Serial No. 508,144, filed May 13, 1955, for Television Systems With Reference to Color. This application is directed to modulated light producing systems for illumination, decorative and mural display purposes, while copending divisional application Serial No. 599,960, filed July 25, 1956, for Ferro-Electric Electroluminescent Color Television Display Device, is directed to the television applications of the invention.

The present invention concerns improvements in light source control and modulation with amplification of white or colored light for wide application in general lighting as in homes, offices, stores, theaters, and the like, as well as in light projection and television screens with high level illumination.

It is an object of the invention to provide means for the illumination of a room by a mural panel which produces light at a selected level and of a selected color and shade, all of which may be varied at will. The panel may comprise a flat, thin mural television screen capable of producing a picture. In addition to the disclosure below, reference is made to my United States Patents Nos. 2,479,880, 2,558,019, 2,595,616, 2,595,617 and 2,848,536 and 2,967,907 which is a continuation-in-part of my copending application Serial No. 12,194, filed February 29, 1948, now abandoned. The panels may be of any desired size and may cover an entire wall or ceiling of a room. Such a panel can be employed to produce any desired mural pattern which need not move, but can be a mural in the true sense, changeable to suit the taste or interest. See U.S. Patent 2,595,616 above. Again, the panel may be a light source only, without a pattern of any kind. For such applications the modulation control can be greatly simplified because the individual picture dots can all be merged into a single "dot" covering the entire panel and controlled by a single pair of ferro-electric capacitors. A combination of individually controlled panels may be used in a room and the panels may take any desired shape to produce a desired effect. With the elimination of the more or less elaborate multiple dot control structure and the substitution of a single ferro-electric bridge or its equivalent, the light panel can be made only a fraction of an inch thick.

Ferro-electric materials and the ferro-electric effect used herein are described and defined in Van Nostrand's Scientific Encyclopedia, first published in 1938 and since revised. Reference is made to page 646 of the third edition, 1958. See also part 3, chapter 7, section 8, of the Handbook of Physics, McGraw-Hill Book Co., Condon and Odishaw, editors, 1958; International Dictionary of Physics and Electronics, page 331, D. Van Nostrand Co. Inc., 1956, and ELF—A New Electroluminescent Display, Sack, pages 1694–1699, Proceedings of the Institute of Radio Engineers, October 1958.

Van Nostrand defines the ferro-electric effect and the materials as follows:

Ferro-electric effect:

"The phenomenon whereby certain crystals may exhibit a spontaneous dipole moment (which is called ferro-electric by analogy with ferro-magnetic—exhibiting a permanent magnetic moment). The effect in the most typical case, barium titanate, seems to be due to a polarization catastrophe, in which the local electric fields due to the polarization itself increase faster than the elastic restoring forces on the ions in the crystals, thereby leading to an asymmetrical shift in ionic positions, and hence to a permanent dipole moment. Ferro-electric crystals often show several Curie points, domain structure hysteresis, much as do ferro-magnetic crystals."

Ferroelectric materials:

"The dielectric analogue of ferro-magnetic materials. Their uses parallel those of ferro-magnetic materials in such applications as magnetostrictive transducers, magnetic amplifiers, and magnetic information storage devices. Rochelle salt was the first ferro-electric materials to be discovered and the barium titanate ceramics are important present-day materials of this type."

It is an object of the invention to provide novel "cold" light producing means for any purpose which may be modulated as desired by an external control signal of any kind, whether a manual light switch giving modulated control, video signals for a television receiver or transducers of all kinds.

It is an object of the invention to provide means for the amplification of light.

It is an object of the invention to provide a modulated light producing panel of large area and a fraction of an inch thick, which has laminar structure, each lamina producing a selected color of light which may be individually modulated or controlled so that any desired brilliance and color may be produced by the panel by the selective control of the light level of each color and the synthesis of the individual colors by emanations from the rear lamina passing through those in front of it.

It is an object of the invention to provide novel means for the production of light in a multi-element screen as an improvement over my copending applications Serial No. 231,095, filed June 12, 1951, now abandoned, for Television Tube, and Serial No. 149,062, filed March 11, 1950, now abandoned, for Television System for High Definition and Secrecy of Image, and which utilizes my U.S. Patent No. 2,568,375, Signal Distributing System, to which reference is made for background.

It is an object of the invention to provide an electro-optical picture surface in which every dot on the surface can be individually controlled. A high frequency voltage is supplied simultaneously to all the dots. Independent elemental neon tubes may be used or a flat gas-filled tube can be lighted locally by a grid controlled high frequency field. I have employed direct current of the order of micro-amperes in connection with a pair of "ferro-electric" capacitors, the two making a "bridge" with the elemental neon tube. The direct current varies the ratio of the voltage between the two small condensers and thereby the ratio of their effective capacities. This action affects the equilibrium of the bridge and so controls the current passing through the small neon tube. Suitable size elements can be made with small flattened tubes coated preferably inside with fluorescent or phosphorescent material. The electro-optical elements may have a size of 0.05 square inch and can be constructed with an area of the order of 0.01 square inch, if desired. Smaller sizes are of course possible, but cost is a limiting factor. Good results can be obtained with a capacity of the order of two to five micromicrofarads per element, an A.C. voltage of about two hundred volts and a D.C. controlling voltage of about a thousand volts for the ferro-electric condenser. An A.C. frequency of twenty kc. is preferred though other values can be employed. Under these conditions the average capacity per square inch of the screen is about three micromicrofarads and light levels of the order of two hundred fifty foot candles are obtainable.

It is an object of the invention to use a titanate capacitor as a ferro-electric ceramic bridge, forming part of a circuit by which small flattened picture tube portions or the like are selectviely energized to create light of a desired color.

It is an object of the invention to provide a novel wall-type screen for both monochrome and color television, having relatively shallow depth substantially independent of the picture size.

With the general use of television screens of increasing size, it appears that a new approach to video presentation is desirable. This arises in part because as cathode ray tubes are made in large sizes, such as 30 inches and 38 inches in diameter, they suffer from many drawbacks, i.e. length, cost, danger of explosion, lack of resolution, lack of brightness, etc. The new method of video presentation and the color television screen described herein, when used in connection with the basic discontinuous dot interspersed technique described in my U.S. Patent No. 2,479,880, has the following advantages:

(1) The resolving power of the screen is at least twice as great in both vertical and horizontal directions as that of present-day receivers. As a result, the 525 lines of conventional kinescope become 1050, which improves its quality very substantially. The proposed screen with twice the effective number of lines may subtend an angle as large as 20 dgreees at the observer's eye.

(2) The size of the screen is quite large (approximately 48 inches wide by 36 inches high), and may be extended into the billboard and motion picture fields.

(3) The brightness of the screen can readily be made ten times or more greater than the phosphor screens of conventional color kinescopes, e.g. 250-foot candles as against 25-foot candles. Also the effective lighting time of any individual dot on the screen is greatly increased.

(4) Substantially saturated colors may be obtained. The use of Wratten filters located outside the tubes eliminates the need of baking to obtain a suitable vacuum.

(5) The depth of the screen is small, namely, one or two inches for the large size screen where there is enough room to place the glow discharge, field emission, diode and triode assemblies in front of each element. For smaller screens where as many as ten layers of glow discharge triodes have to be placed in front of one another, the thickness may be as much as fifteen inches. Where the screen is employed as a light panel for illumination purposes, its thickness can be reduced to a fraction of an inch.

(6) Ease of maintenance, because all parts are removable from the screen for replacement or repair as components and are capable of being mass produced.

These advantages result from the use of new techniques for the production of light and for the distribution and storage of video information. The new scanning system permits the presentation of four times as many picture elements as are normally seen on a television screen with the use of video channels of normal band width. With further development of the structure here shown, the resolving power of the screen might be increased by a factor much larger than two, thus permitting viewing angles greatly in excess of 20 degrees.

For production of the light, the face of the screen comprises a large number of very fine, e.g. 0.04 inch O.D. glass tubes filled with gas at low pressure, e.g. neon at a pressure of 200 mm., and arranged vertically. In one form, each tube has small transparent electrodes located on one outer wall and a tungsten wire at ground potential running internally along the axis of the tube. As will be seen, a second outside electrode may replace the tungsten wire. By the application of a high frequency potential, e.g. fifty kc./s., to the transparent electrodes, localized excitation of the gas may be produced. The light output so produced varies with the amplitude of the applied potential. In the case of color, three tubes are installed in line, one in front of the other or in echelon. The red tube at the rear contains neon at a pressure of 200 mm. Hg and is covered with a red Wratten filter. The blue and green tubes are preferably made of ultraviolet transparent glass and the blue and gree nphosphors therefore may be located externally on these tubes if desired. These two tubes are filled with nitrogen and helium at about a pressure of 100 mm. Hg, in equal proportions. To reduce the absorption of the light by the phosphors, the tubes may be immersed in a high refractive index material such as bromobenzine which has a refractive index of 1.65, whereas the phosphor has an index value which is only slightly greater. It is desirable that the two indices have as nearly the same values as possible.

For modulation of the light output, the modulation circuit associated with each transparent electrode utilizes two ferro-electric condensers in a bridge circuit. The capacity of these condensers may be varied by the application of a D.C. potential to them as shown below. The circuit arrangement for each picture element and for the sake of simplicity, the brightness of each element, is shown controlled by the D.C. potential of a slider contact of a potentiometer. When the position of the slider is changed, the D.C. potential increases across one condenser and decreases across the other. Thus, the capacity of one condenser decreases while the other increases, thus causing an unbalance of the bridge circuit and the application of an HF voltage to the electrode of the tube. With a typical arrangement, a D.C. current flowing for one sixtieth of a second is sufficient to raise the light level from zero to full light output. The direct current required to give full light output is less than ten micro-amperes for each picture element.

The storage of the video information is handled as follows. As previously mentioned, the ferro-electric condensers have the ability to store the video information and maintain the light output at a constant level between the arrival of two successive signals or pieces of video information. As a consequence of this action, light output is increased and flicker is decreased. The charge or discharge of the condensers occurs during a period less than half the frame time, namely, one-twentieth of a second, by means of a glow discharge triode. By means of suitable 6,000-volt power supplies, and a commutator, a positive potential of 6,000 volts may be applied to the needle of a field emission glow discharge triode of special design. The first grid of this triode is at ground potential. Because of the gas discharge action of the triode, either a positive or a negative charge may be acquired by the anode circuit, the magnitude of the charge being controlled by a grid. The capacity of this grid is very small, about 0.2 $\mu\mu f.$, and small voltages of the order of only 20 volts are sufficient to obtain complete modulation. Video information may be stored on, employed for control and erased from this grid by means of a field emission glow discharge diode in the distributing circuit.

In the case of television, the picture is changed thirty times a second. There are other applications in which the change in brilliance can be made at a lower rate, e.g. a few seconds, a minute, or more. In those cases the current required to charge the ferro-electric condenser which is well insulated, can be extremely small, i.e. $10^{-10}$ amperes or less. At the same time the alternating current may have a higher frequency, e.g. 30 kc. or more, producing a resultant current passing through the light source that is very high, e.g. ten milliamperes or more. The current gain is therefore very high, e.g. $10^8$. The application of these structures as light amplifiers can be very efficient in varied fields.

A new method of scanning is provided by this invention. In conventional television practice, a scanning frequency of 2×30 fields per second is required to avoid flicker because of the rapid decay time of the phosphor. Because the band width is limited, the number of picture elements that may be presented per frame is also limited. Usually only four hundred dots in each of the four hundred eighty horizontal lines of the picture are used.

In the case of color, the number of effective picture elements is even further reduced. In the screen here described, the quality of the picture is greatly improved because the number of dots is doubled in both horizontal and vertical directions. This is the result of the storage of the video information of the condensers associated with each picture element in the circuit. The video information is stored until the arrival of new information. That is to say, each dot is illuminated substantially continuously to all intents and purposes, at a level required by the signal information, until the next signal for that dot arrives. Because of this continuity of illumination, the flicker is reduced and the quantity of light increased many fold. In the new method of scanning, eight fields are presented in succession at a frequency of 8×7.5 per second. The dots presented by each of these eight fields are interspersed so that the observer sees good continuity in the movement of objects across the screen even when this movement is rapid because a dot structure is produced in 1/7.5 or 2/15 of a second.

The drawings are presented as representative of the development of the invention from an idea to its embodiment in various physical forms. The several figures are intended to be illustrative and are not to be taken as limiting.

FIGURE 1 is a perspective view of one form of lighting element forming part of a television screen and illustrating the basic principle of the lighting of individual localized portions of a filamentary tube containing a gas such as neon or the like at low pressure to produce elemental area picture dots representing a pictorial reproduction by excitation by relatively high frequency electricity.

FIGURE 2 is a schematic diagram showing, by mechanical analogy, the progressive control of local light in a small filamentary tube by the change in the ratio of two capacities, involving physical movement of a common plate and is representative of the basic modulation of each dot of a picture screen by a bridge circuit containing a double capacity.

FIGURE 2A shows the application of the dot modulation of FIGURE 2 to a series of adjacent dots on tubes comprising a color television screen.

FIGURE 3 is a diagrammatic curve of capacity plotted against voltage showing a characteristic basic property of a condenser comprising a ferro-electric ceramic material such as barium strontium titanate.

FIGURE 4 is a schematic diagram showing how the ratio of the D.C. voltage applied to two barium strontium titanate condensers can be changed. Because the A.C. capacity varies in accordance with the applied D.C. voltage, the mechanical progressive variation shown in FIGURE 2 can be replaced by a stationary electric control of the voltage applied to the common lead of the two condensers.

FIGURE 5 is a schematic composite diagram showing the variation in capacity of two ceramic condensers in series as a function of the bridge voltage.

FIGURES 5A, 5B and 5C are equivalent circuits showing various forms twin ceramic condensers may take to make the bridge construction.

FIGURE 6 is a schematic arrangement showing the application of the basic principle of local modulation of light with a ceramic condenser bridge, by varying the capacity ratio by a very small direct current, to the modulation of the different elements or dots of a line on a television screen.

FIGURE 7 is a schematic showing on one application of the basic amplification of current by the field emission or glow discharge air field triode described in my U.S. Patent No. 2,499,233, for control of voltage applied to the ferro-electric condenser disclosed in FIGURE 6.

FIGURE 9 is a schematic diagram of the use of two conventional triodes and mechanical commutators presented as simplified showing for obtaining the same result as the electro-ionic commutation of my U.S. Patent No. 2,474,338 in a ferro-electric bridge controlled screen system.

FIGURE 10 is one form of graph of the relationship of charge in volts on condenser K of FIGURE 9 with respect to time, showing the storing and restoring cycle.

FIGURE 11 is a schematic showing of how the different elements of the screen are supplied in accordance with FIGURE 2 of U.S. Patent No. 2,474,338. The mechanical commutator can be replaced by thyratrons as shown by a double throw double pole switch arrangement employed to show the functional equivalence of the two means.

FIGURE 11A is one form of thyratron electronic commutation circuit arranged for connection as part of the circuit of FIGURE 11.

Figure 12:
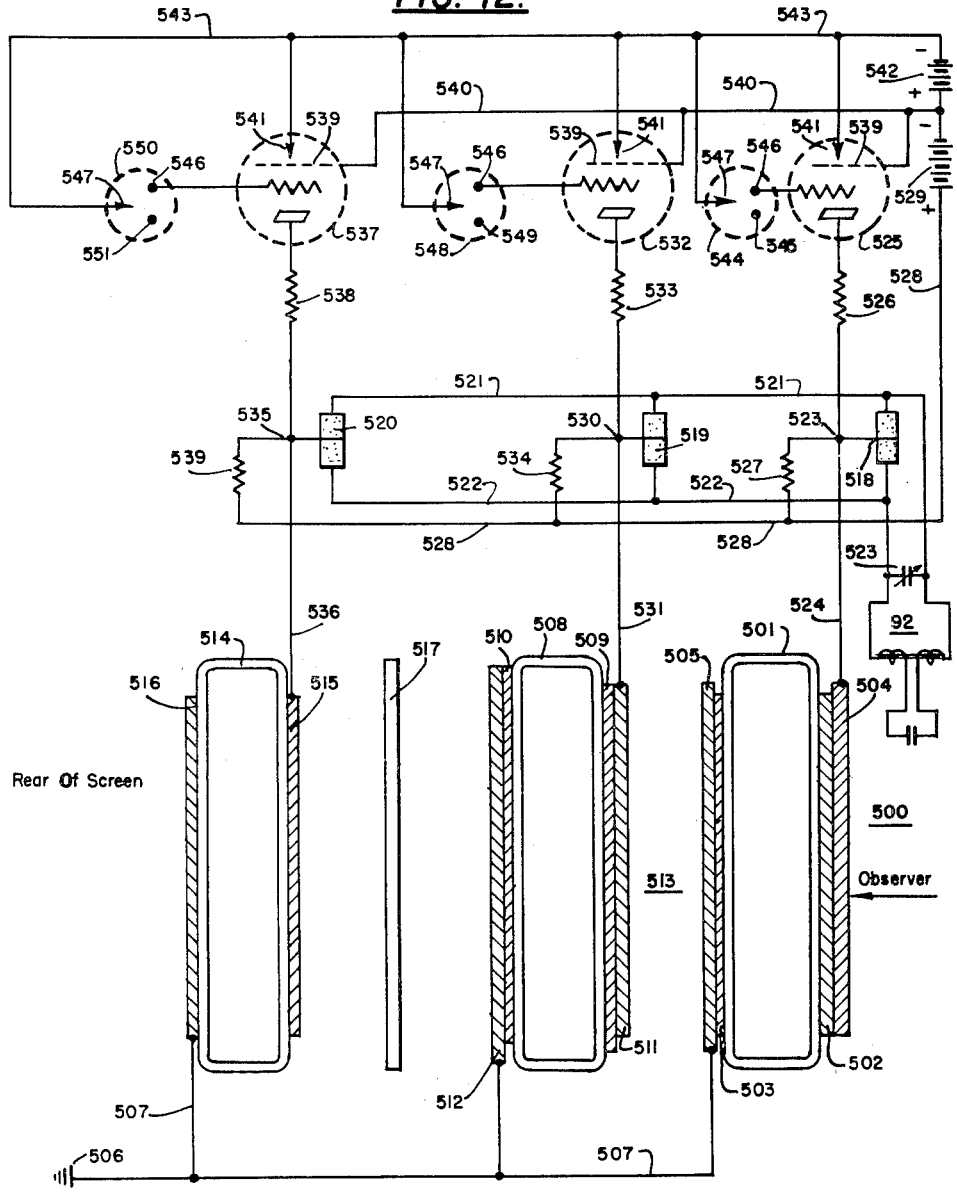

FIGURE 12 is a schematic section of an adaptation of the invention to a flat three-color television screen.

FIGURE 13 is a schematic showing of the application of my discontinuous dot interspersed technique described in U.S. Patent No. 2,479,880 to the ferro-electric stroage condenser television system.

Figure 13A:
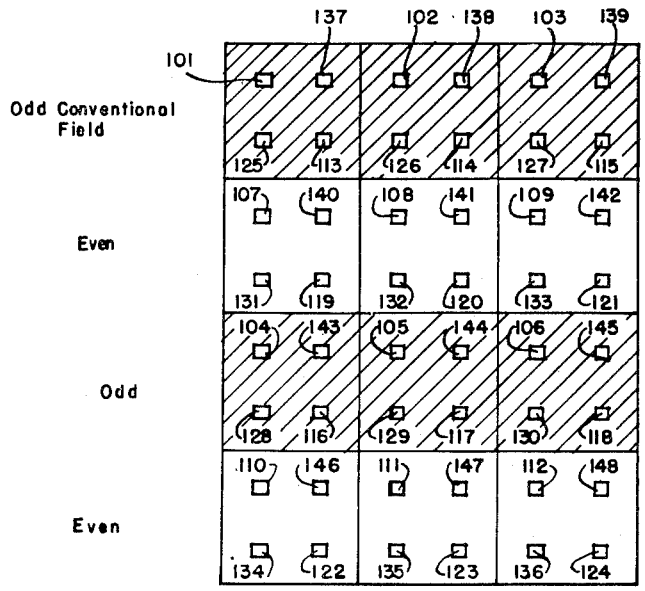

FIGURE 13A is a schematic representation of a conventional scanning pattern, showing the multiplication of the number of dots for the same screen area by a factor of four.

FIGURE 13B is a schematic showing of the relation between the conventional dots in white and the new dots in black and the order of arrival of the video signal information in FIGURE 13.

Figure 14:
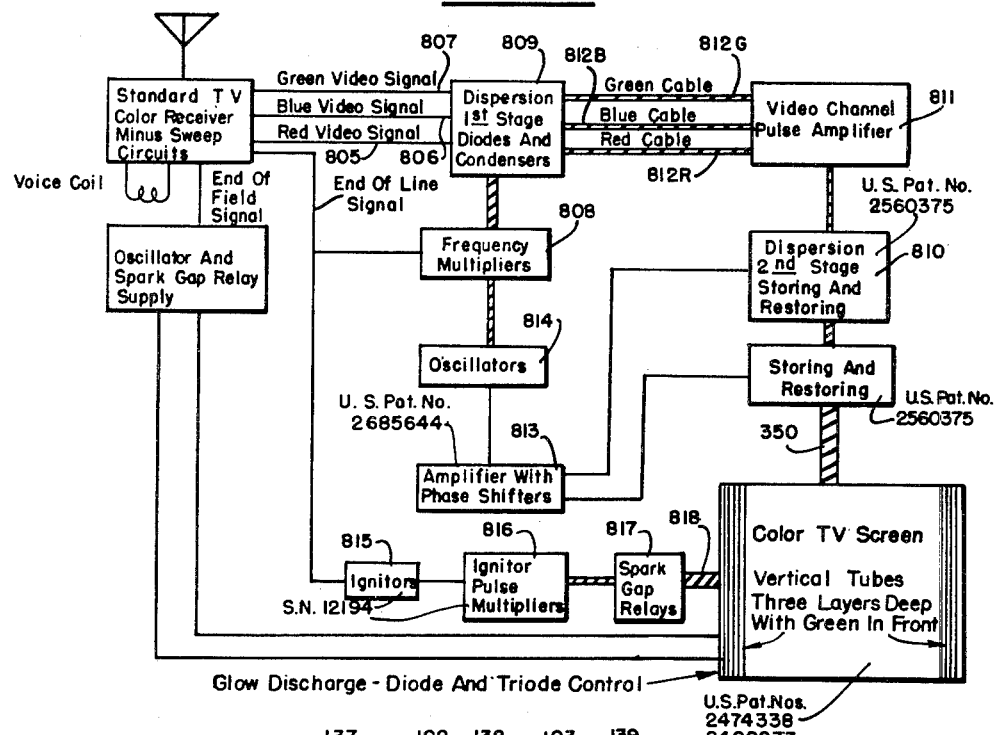

FIGURE 14 is a schematic block diagram of a television receiving system according to the invention and showing the employment of many of my related inventions in combination to produce a complete large screen, high light level color television system.

In the drawings, like numerals refer to like parts throughout.

In FIGURE 1 is disclosed one form of elemental structure utilizing a small tube 10 capable of being coated inside with a fluorescent or phosphorescent material 11 and filled with a low pressure inert gas of the kinds commonly used in glow discharge tubes such as argon, neon, krypton and the like. As the tube 10 represents a line on a television screen, it should be dimensioned accordingly to comply with television broadcast standards. In closed circuit television installations much greater freedom in choice of tube size can be exercised. When the inner coating is not employed and local gas glow discharge alone is relied upon to produce an image, the tubes 10 can be filamentary, but in many cases they are substantially larger. Where cost is not prohibitive phosphors can be used with filamentary tubes. In outdoor screens of large size, the elemental tubes 10 can be correspondingly larger. Where the size of the television screen permits, the tube diameter may be chosen to correspond to one-half, one-third or one-quarter of line thickness as suggested in my copending application Serial No. 231,095, filed June 12, 1951, for "Television Tube" for obtaining high definition.

The front part of the tube 10 in FIGURE 1 has been broken both to show that the tube 10 is much longer than might appear, and to permit the inclusion of a simple representative circuit portion so that the basic principle of local or spot lighting which permits the utilization of discontinuous dot interlace scanning disclosed in my pioneer U.S. Patent No. 2,479,880, now licensed to the television industry, may be illustrated. Reference is also made on this point to my copending application Serial No. 149,062, filed March 11, 1950, entitled "Television System for High Definition and Secrecy of Image." It will be seen that the tube 10 has a spot or like portion positioned between the plates 12 and 13 of a simple condenser which are connected by wires 14 and 15 to a tank circuit 16 comprising inductance 17 and a suitable condenser 18', the circuit being grounded at 19. A high frequency voltage may be impressed across tank circuit 16 by any suitable local oscillator means which may, for example, be connected to wire 14 and grounded. When the frequency of the applied oscillation corresponds to the resonant frequency of tank circuit 16 the voltage across plates 12 and 13 is a maximum, as is also the glow discharge or light emitted by the tube portion between the plates. As the effective capacitance of tuning condenser 18 is varied so also is the voltage across plates 12 and 13 with a resultant decrease in the amount or brightness of the light emitted by the portion of tube 10 subject to the acion of plates 12 and 13. The upper part of FIGURE 1 is a schematic showing of a series of dots on a vertical or horizontal line of a picture screen represented by tube 10 and comprises condenser plates $12a$, $12b$, $12c$, $12d$, etc. and a common plate $13x$ grounded at $19x$. It will be seen that voltages of different magnitudes may be applied to each of the plate elements $12a$, $12b$, $12c$, $12d$, etc., and the light emitted by the corresponding portions of tube 10 may be controlled both in brightness and time for use as picture elements in black-and-white as well as three-color television. As will appear below, such a picture is produced on a screen made up of a large number of tubes 10 in side-by-side relation.

Although the circuit of FIGURE 1 can be used to modulate the light produced, as described above, it is not the best arrangement for that purpose. FIGURE 2 shows a mechanical counterpart of a next step by which the modulation of the light is obtained by means of a bridge circuit employing two condensers in series. The gas filled tube 10, with or without a phosphor coating 11, is shown in section with a "dot" portion between representative condenser plates 12 and 13. A local oscillator or tank circuit 16 is used, as in FIGURE 1, but the variable condenser 18' is now used merely as part of the local oscillator with its frequency adjusted to about 50 kc., as one example for successful operation. A double condenser which is effectively two condensers in series has fixed curved plates 20 and 21 of equal size and curvature and a movable plate 22 pivoted at 23 and rotatable in either direction as shown. Plate 20 is connected to tank 16 at junction 24 by wire 25. Plate 21 is connected to tank 16 at junction 26 by wire 27. Movable plate 22 is connected to plate 13 by wire 28. Plate 12 is connected to the midpoint 29 of inductance 17 by wire 30. The above arrangement provides progressive control of the light emitted by the activated portion of tube 10 or coating 11 because rotation of plate 22 varies the ratio of the two capacities $C_1$, represented by plates 21, 23 and $C_2$, represented by plates 20, 22 which affect the balance across the bridge of which plates 12, 13, tube 10, wires 28 and 30 form a part.

The application of this construction to a three-color television screen is indicated in FIGURE 2A in which corresponding numerals are employed with subscripts and primes. The color phosphors, gases or filters are indicated at $11_R$, $11_B$ and $11_G$ wherein the subscript letters represented red, blue and green.

Where the capacities $C_1$ and $C_2$ are condensers, having a dielectric of ferro-electric ceramic material such as barium-strontium-titanate, they can be constructed to produce a characteristic curve of capacity plotted against applied voltage as shown in FIGURE 3. As there shown, the main body of the curve has a fairly long, straight portion with a negative slope extending between a maximum around point 31 and a minimum at the breakdown point 32.

In the curve of FIGURE 3 a ferro-electric ceramic having a dielectric constant K of 6,000, yields a C max. or maximum capacitance of about ten micro-microfarads on application of one hundred fifty volts and a C min. of 0.8 volt, just before breakdown. The substantially straight portion between C max., point 31, and C min., point 32, is the range of successful operation.

The subcombination circuit shown in FIGURE 4 contains two ferro-electric ceramic condensers $C_1$ and $C_2$ comprising metallic plates 40 and 41 separated by a ferro-electric ceramic dielectric 42 and metallic plates 43 and 44 separated by a ferro-electric ceramic dielectric 45, respectively. Although dielectrics 42 and 45 are both stated to be of ferro-electric ceramic material and such construction is presently preferred, successful results have been obtained where only one of the two dielectrics is ferro-electrical ceramic material. Plate 40 is connected by wire 46 to one side of a 1,000 volt D.C. supply 47, the other side of which is connected to plate 43 by wire 48. Plates 41 and 44 are connected by a wire 49 having a lead wire 50 connected thereto. Wire 50 contains decoupling resistance 51 of about 1,000 megohms and a slide 52 arranged to be moved along supply 47 from zero to 1,000+ volts. This arrangement provides an electrical means for varying the relative capacity of condensers $C_1$ and $C_2$ from 1:5 and 5:1 respectively, depending upon which end of D.C. supply 47 the slide 52 is positioned. As a practical matter, because of the addition of A.C. and D.C. voltages together with parasitic capacity in the circuit components, the effective ratio variation is only about 1:2 and 2:1, which is sufficient to produce the desired effects.

The modified form shown in FIGURE 5A combines the two condensers in a compact form. The two middle plates 41 and 44 are replaced by a single plate 53 with coatings 54 and 55, two mils in thickness, of a ferro-electric ceramic such as barium-strontium-titanate between it and plates 40 and 43, respectively. Wire 50 is connected to central plate 53 as shown. Slide 52 rides on resistor 56 for control of the D.C. supply from battery 47.

FIGURE 5 is a composite characteristic curve for the condensers $C_1$ and $C_2$ of FIGURES 4 and 5B, showing the respective values of capacitance plotted against applied voltage. In FIGURE 5B two ferroelectric ceramic condensers $C_1$ and $C_2$ comprising plates 60 and 61, separated by ferroelectric ceramic material 62 and plates 63, 64 separated by ferroelectric ceramic material 65, respectively, are connected in series across a 1,500 volt D.C. supply 66 by wires 67, 68 and 69. A bridge is formed by wire 70 connected to junction 71 with wire 69 and having a slider contact 72 riding on a 1,000 megohm rheostat resistor 73 and containing a current limiting resistor 74.

It will be seen that because of the negative slope of the characteristic curves $C_1:C_2$ is $V_2:V_1$, the circuit constants are chosen so that the straight portions of the capacitance characteristic curves between operating points O.P.$_1$ and O.P.$_2$ coincide. On the curve $C_1$ it will be noted that O.P.$_1$ occurs at about ten micro-microfarads, well below $C_1$ max. of 10.5 micro-microfarads and that O.P.$_2$ is set at about one micro-microfarad, well above breaking point B.P.$_1$ of about 0.8 microfarad. On the curve $C_2$ the breaking point B.P.$_2$ occurs beyond O.P.$_1$ and O.P.$_2$ is well within $C_2$ max. For the particular setting of slide 72 shown, the condensers $C_1$ and $C_2$ are operating at O.P.$_n$. FIGURE 5 is, of course, a representation of two curves such as are shown in FIGURE 3, and which have been selected with the same constants, reversed because of the negative characteristic slope and superimposed. The points O.P.$_1$ and O.P.$_2$ are determined by the safe limits of coincidence of the straight portions of the curves. It will be understood that the two curves $C_1$ and $C_2$ in practice might not always coincide ideally but have a slight curvature or bow between the points O.P.$_1$ and O.P.$_2$ which is entirely satisfactory within selected limits of tolerance.

Figure 6A:
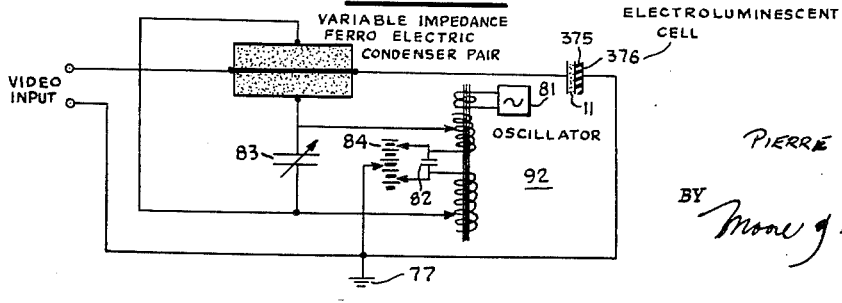
FIGURE 6A is an equivalent schematic circuit showing one application of the invention to the controlled illumination of a flat surface.

FIGURES 4, 5A, 5B, 5C and 6A are intended to show equivalent constructions of paired ferro-electric condensers according to the invention and similar or equivalent parts are indicated by the same numerals. FIGURES 5C and 6A show the application of the modulation control structure to flat or slightly curved surfaces which may be large enough to cover an entire wall or ceiling. Where a mural is desired condenser plate or equivalent 12 may take the form of a dot or other elemental picture area, or it may be larger, as in patterned murals made up of large picture elements such as "so-called" modernistic design in any desired color. Again, the condenser plate or equivalent 12 can be large enough to cover the entire wall surface which is then illuminated evenly at any desired modulated light level and in any selected color.

The schematic arrangement in FIGURES 6 and 7 demonstrates one possible manner of utilizing the above principles for the modulation of light, using an exceedingly small direct current of the order of a fraction of a micro-ampere to control a relatively high value of current in a small elemental screen area, the electro-optical element representing a dot, with plenty of light production, the brightness being about ten candles per square foot or better. This effect is achieved with a modulation component of very small size, having a volume of the order of twenty by forty by forty mils.

A television screen component tube 75 of glass has a transparent conductive coating 76 of zinc oxide or the like on the inner side thereof. Coating 76 may be grounded as at 77 and corresponds to common grounded plate 13x of FIGURE 1, except that it serves all of the tubes 75 making up the television screen, which may be 525 or more, including multiples or fractions thereof, depending upon the standards in force and the definition desired.

Each tube 75 has elemental areas or dot portions 78, 78', 78", etc., which are normally substantially contiguous, but are shown spaced in FIGURE 6 for clearness. The segments 78 etc. may comprise cylindrical rings of conductive transparent material or localized portions 81, 81', 82" etc., shown connected to a fine contact wire, which need not be transparent. A barium-strontium-titanate sheet 79 suitably supported serves as the dielectric for the many pairs of ferro-electric condensers 80, 80', 80", etc. A local oscillator 81 supplies the energizing power to a magnetically coupled pair of windings 81 which together with condenser 82, variable condenser 83 and battery 84 provide a power supply 92 which is the equivalent of the energizing circuit of FIGURES 1 and 2. Resistors 85, 85', 85", etc. provide different D.C. voltage across condenser pairs 80, 80', 80", etc., and therefore different corresponding light levels at the elemental screen areas 78, 78', 78", etc.

The commutation system shown in FIGURE 7 comprising synchronous motor 86, brush 89, contact segments 90 and battery 91 for operating air field emission triode 88 is merely a mechanical representation for the purposes of simplicity of presentation and a quick understanding of the principles here employed. However, the preferred form of the invention employs an electronic distribution system without moving parts. As will be shown below, motor 86 is synchronized on the end of line signal of a standard television receiver and the modulation applied at terminal 87 is supplied by first stage of video signal distribution 614 and cable 633 of FIGURE 9, for example. The anode, grid and point emitter assembly 88 is the field emission triode of my U.S. patents indicated which provides a very cheap, compact control operating in the atmosphere. The preferred distribution system is disclosed in my U.S. patents, as followers, and will be discussed below:

To pass from the single video channel to the respective vertical wires of the grid control system of the picture screen, the signal distributing system circuits shown in my U.S. Patents No. 2,471,253; No. 2,568,375; No. 2,541,133; No. 2,565,102; No. 2,565,103; No. 2,513,760; and No. 2,555,015, are used. The distribution of the video information along the vertical wires of the screen control is made according to my U.S. Patent No. 2,474,338. The very small level information is amplified for each dot according to my U.S. Patent No. 2,499,233 the output of which is supplied to the middle plate of the twin ferro-electric condensers of the present invention. The above patents in turn refer to other of my related U.S. Patents, such as, for example, No. 2,201,066, for a large television screen and all these patents, as well as those identified above, are incorporated herein by reference.

Figure 8:
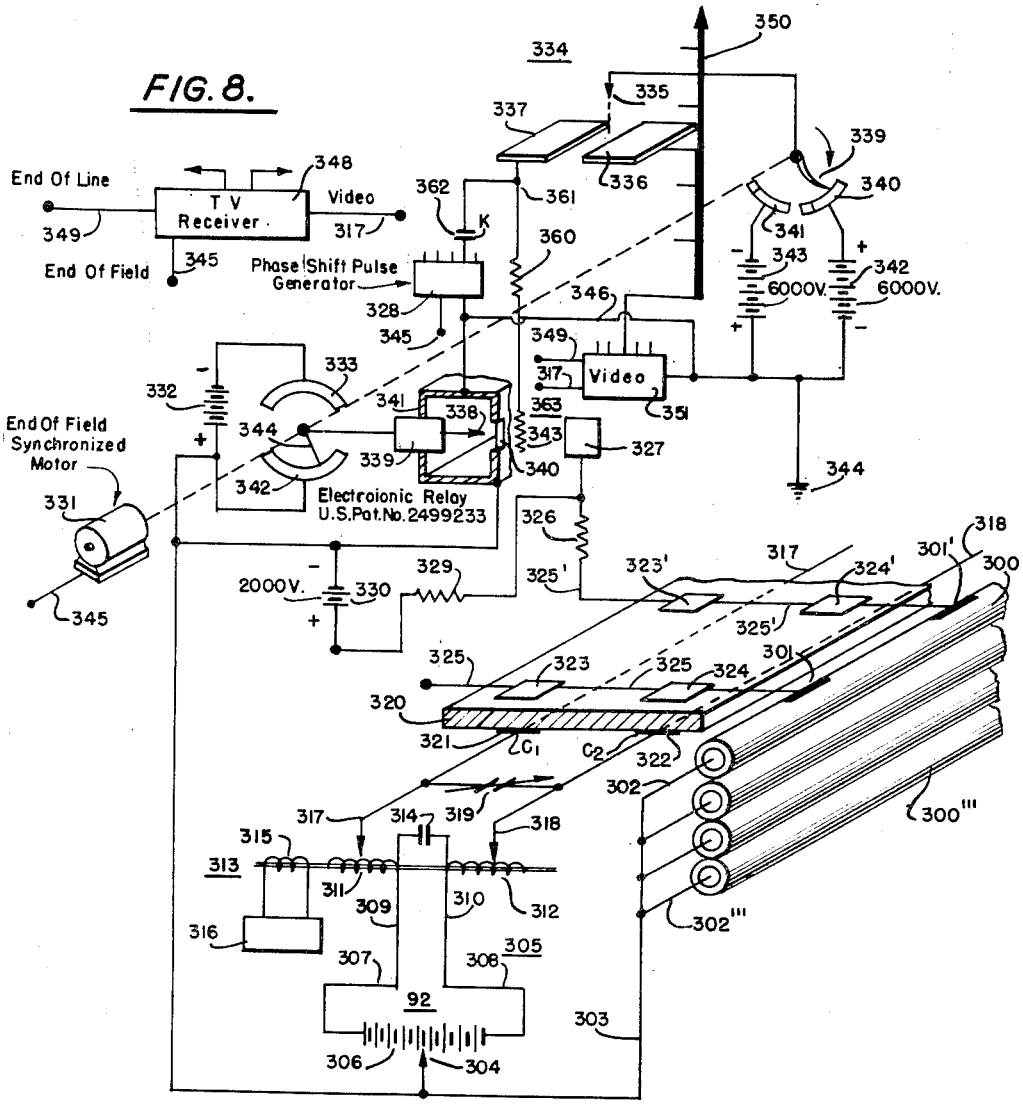
FIGURE 8 is a schematic showing of one form of combination of the preceding structures for ferro-electric dot modulation with the electro-ionic commutation disclosed in my U.S. Patents Nos. 2,474,338 and 2,499,233.

In FIGURE 8, gas filled tubes 300, of the same color, comprise the face of a large television screen. Each tube has a large number of independent electrodes 301, 301', 301", etc., corresponding to the number of effective dots on each line here shown expanded for clarity. Inside each tube is a wire electrode 302, each connected to a common lead wire 303 at a fixed voltage with reference to ground. Tubes 300 are coated inside with fluorescent material and contain a mixture of argon and mercury vapor at low pressure. Depending upon the color desired, other gases such as sodium vapor, xenon, neon, or the like may be used alone or mixed together. Where added ultraviolet light is desired to excite the phosphors, krypton, nitrogen and the like may also be used. The art is replete with other examples.

The local modulated light between each electrode 301 and the corresponding internal conductor 302 produced by the local controlled excitation of the gas, locally excites the phosphor deposit inside the tubes 300. Wire 303 is connected to the balance point 304 of bridge circuit 305 containing a battery or the like 306, having its terminals connected by wires 307 and 308 to the terminals 309 and 310 of split secondaries 311 and 312 of high frequency transformer 313. Terminals 309 and 310 are connected by a condenser 314 of high capacity. Primary winding 315 is connected to a fifty kilocycle oscillator 316 which supplies the power to illuminate the local areas or dots on the screen.

Leads 317 and 318 are tapped off secondaries 311 and 312 and are connected by a low capacity tuning condenser 319. Leads 317 and 318 are extended along a ferro-electric insulating support member 320. A sheet of ferro-electric materials 320 of barium-strontium-titanate or the like, supports a series of pairs of condensers, one pair for each dot represented by electrode 301. The bottom plates 321 are connected to lead wire 317 on one side and the bottom plates 322 are connected to lead wire 318 on the other side. The top plates 323 and 324 of each pair of condensers are connected together by a lead wire 325 leading from electrode 301. It will be understood that there is a ferro-electric support member 320 for each tube 300. As a practical matter the ferro-electric material 320 is built up from a number of smaller pieces about 0.020 mil thick. As discussed above, each pair of plates 321 and 323 comprises a capacity $C_1$ and each pair of plates 322 and 324 comprises a capacity $C_2$.

The bridge comprising capacities $C_1$ and $C_2$, secondaries 311 and 312 is adjusted to A.C. equilibrium, providing a condition of no voltage between electrodes 301 and conductor wires 302. The ratio of the capacities $C_1/C_2$ is determined by the inverse ratio of the effective voltages of secondaries 311 and 312. The application of a D.C. signal voltage to wire 325 changes the ratio $C_1/C_2$, as described in connection with FIGURE 5 and provides an exciting A.C. voltage of modulated value between the selected electrode 301 and wire electrode 302, locally exciting the gas and the fluorescent material representing the corresponding picture dot. The amount of light produced is a function of the D.C. voltage on the selected wire 325 and corresponds to the light level of the corresponding point in the picture being reproduced. Because material 320 is a very good insulator, a very small D.C. current of the order of microamperes, flows in conductor 325. The corresponding A.C. current across electrodes 301 and 302 is of the order of milli-amperes providing a current amplification of about a thousand to one and therefore a large amount of light.

The rest of the structure of FIGURE 8 is concerned with obtaining the D.C. average voltage on wire 325. A decoupling resistance 326 connects wire 325 to plate 327 of an air emission discharge triode 328. A plate resistance 329 of two megohms is connected to the positive terminal of a voltage source 330 of about 2,000 volts D.C.

Air emission triode 363 is constructed according to my U.S. Patent No. 2,499,233 and comprises a needle 338 mounted on a good insulator 339 in elongate metallic channel shaped box-like enclosure 341. The box 341 has a large number of needles 338 opposite each of which is an opening 340. Circular opening 340 may be covered with screen wire to serve as a shielding grid if desired. Box 341 is conductive and is connected to the negative lead of battery 330. The air emission triode comprises a control grid 343 and a plate 327 in addition to the elements just described which serves as a cathode.

Needle 338 is connected to rotating brush 344 of a commutator driven by synchronous motor 331 and having ring segments 333 and 342. Motor 331 is synchronized on end of field signal by wire 345. Brush 344 alternatively contacts sectors 333 and 342 connected respectively to the negative and positive terminals of six thousand volt battery 332. It will be seen that sector 342 is at the same voltage level as box 341 and opening 340.

During the interval when needle 338 is at negative six thousaind volts potential relative to opening 340, a flow of negative electrons flows through opening 340 and passes to plate 327. This electron flow is controlled by the voltage on control grid 343 relative to the voltage of the box material at the edges of opening 340. During the short interval when brush 344 contacts sector 342 the electron flow is cut off and the instantaneous voltage on control grid 343 does not affect the plate current. Grid 343 is connected, preferably through a decoupling resistor 360 to one electrode 337 of a glow discharge diode forming part of an electronic commutator 334 made in accordance with my U.S. Patent No. 2,474,338, comprising a needle 335 symmetrically positioned in front of two electrodes 336 and 337. Needle 335 is connected to rotating brush 339 driven by synchronized motor 331. Brush 339 makes contact for a short period with segments 340 and 341, successively. Sector 340 is connected to the positive terminal of six thousand volt battery 342 and sector 341 is connected to the negative terminal of a similar battery 343. It will be seen that the positive charges on brush 339 discharge electrode 337 during the erasing time discussed in the above patent and in connection with FIGURE 9 below and thereafter a negative charge is applied to electrode 337. This application of charges does not begin immediately upon the contact of brush 339 with segment 341, but occurs only during the short pulse supplied by phase shift pulse generator 328.

The radio waves received are amplified and selected in conventional manner by the television receiver 348 which supplies the end of field channel 345, the end of line channel 349 and the video channel 317. End of line channel 349 and video channel 317 are supplied to a first stage distribution system 351. Signal distributing system 351 is constructed in accordance with the techniques described in Patents Nos. 2,568,375 and 2,685,644. The successive video signals corresponding to the elemental dots of the picture arrive at a frequency about twice that of the bandwidth frequency, e.g. four megacycles per second, and are distributed in as many independent channels as there are dots in each horizontal line of the picture, e.g. four hundred eighty channels. In each of these channels the video signals succeed one another at the line rate, e.g. 15,750 per second. Of course in order to make the drawing as simple as possible, only a single channel 350 is shown, corresponding to the vertical wire in the screen. It will be understood that each vertical wire 350 supplies signals to one dot in each horizontal line of the picture. In the preferred construction these dots are one above the other. Each vertical wire 350 is supplied by an independent electronic commutator having sectors similar to 340 and 341 as described above. Electrode 336 is connected to the vertical wire 350 as shown. It will be understood that successive electrodes 336′, 336″ . . . are likewise so connected as shown by the stub connecting wires projecting from the heavy wire 350.

A phase shift pulse generator 328 is connected as shown. The pulses from generator 328 are synchronized on the end of field signal 345 and utilized as disclosed in my copending U.S. patent application Serial No. 12,196. There are as many output leads from phase shift pulse generator 328 as there are dots in a vertical line of the picture, e.g. four hundred eighty. One such lead is shown in the drawing connected to junction 361 through condenser 362. Junction 361 is connected in turn to electrode 337 and resistor 360 in the circuit of control grid 343. At the instant of arrival of a pulse from generator 328, the voltage of electrode 337 is abruptly changed. The duration of this pulse is of the order of one-half of the line scanning or 1/31500 of a second. Immediately thereafter the lead to condenser 362 returns very rapidly to its previous voltage level. The operation of the portion of the device just discussed is as follows. Before the starting of the field scanning a high positive voltage is applied by sector 340 to the needle 335 of the electronic commutator 334. As a result, both electrodes 336 and 337 receive the same positive voltage and are ready for the succeeding control step. When the needle 355 receives a high negative voltage from the sector 341 a glow discharge occurs from the needle 355 to the electrode 336 which, because it is connected to the vertical wire 350, drains off the discharge with substantially no charged particles reaching electrode 337.

At the same time the successive video signals received at television receiver 348 have been distributed among the many different independent channels comprising vertical wires 350. The information corresponding to the light level of the first dot of the first horizontal line of the picture has been supplied to the first vertical conductor 350 and the information corresponding to the second dot of the first line of the picture to the second conductor 350′, etc., so that during the first line scanning a great number among the four hundred eighty vertical conductor wires 350 will have received voltage applications corresponding to the dot on their respective channel. As a result, each electrode 336, 336′, etc. connected to the vertical wire 350 has received the same voltage. This is true of all of the electrodes 336 in the same vertical line. Of course it will be understood that those electrodes 336b which are connected to the next succeeding vertical wire 350′ will have a different voltage corresponding to the voltage of the light level of the second dot on the first line. At the exact instant when a pulse is produced by generator 328 of a given exact amplitude, the corresponding electrode 337 becomes more positive and during this very short interval attracts the negative particles flowing from needle 335 and receives a charge which corresponds to the light level of a dot which is stored on the condenser 362. It is to be noted that this condenser 362 also indicated by the letter K is the same condenser as that indicated by the letter K in FIGURE 9. As soon as the very short pulse from generator 328 ceases, the flow of electric charge to electrode 337 likewise stops. Any further glow discharge from needle 355 ceases automatically when the electrodes 337 and 336 return to the same voltage. As a result, the instantaneous voltage of the vertical conductor 350 is now "printed" or stored in the form of a charge on the electrode 337 and its associated condenser 362 also indicated by K. The character of this voltage is shown in the wave diagram of FIGURE 10. The voltage from condenser 362 is supplied to control grid 343 through the decoupling resistor 360. During this whole interval the functioning of the glow discharge amplifier 363 was stopped because the needle 338 has no voltage impressed thereon from brush 344. After the stored video information has been supplied to grid 343, brush 344 contacts the top sector 333 applying a high negative voltage to the needle 338, and the corresponding current reaching plate 327 produces a drop of voltage in resistor 329 which corresponds to the light level of the first dot of line 1.

In the same manner and during the same time a similar operation is produced by other electronic commutators on the remaining half of the line. Half of the video information of the dots of the horizontal line are recorded and there is a corresponding drop of voltage in the corresponding resistances 329, 329', etc. in the first horizontal line. The drop of voltage in the resistor 339 changes the ratio of the D.C. voltage between the capacities $C_1$ and $C_2$ of the ferro-electric condenser comprising plates 321, 323, and 322, 324 separated by the block of ferro-electric material 320. A corresponding high frequency voltage is therefore applied to the local dot electrode 301 of tube 300, producing the localized glow corresponding to the light level of that particular elemental area of the picture.

Control grid 343 or resistor 326 can be connected to any source of control voltage such as a transducer like a microphone, responsive to sound, a winding sensitive to an electric field, or a photo-electric cell sensitive to light. See for example, my French patents comprising (*a*) 1st addition No. 29,701 of Patent No. 574,515 for Despositif de reglage de l'intensite due courant traversant une ampouli a arc dans une atmosphere rarefiee de gas ou de vapour; (*b*) No. 668,568, granted May 10, 1928, for Perfectionnement aux despositifs d'allumage des appareils stroboscopiques; (*c*) No. 705,689, granted February 8, 1930, for Perfectionnement aux methodes et despositifs d'exploration des images en television, together with (*d*) the 1st addition thereof, No. 39,301, granted April 9, 1930, bearing the same title; (*e*) No. 812,946, granted January 27, 1936, for Appareil Amplificateur de Lumiere; (*f*) 1st addition No. 48,053 of Patent No. 804,151, granted May 15, 1936, for Perfectionnements aux appareils a exploration par faisceau cathodique utilisables notamment en television; and (*g*) No. 981,296, granted April 1, 1943, for Procede permettant de controler localement la lumiere fournie par un tube a gax rarefie et son application a la television, which show the use of a photo-electric cell connected to a glow discharge tube for light modulation and amplification. Such constructions permit signal amplifications of ten thousand to one or higher.

Particular reference is made to FIGURES 3 and 5 of 1st addition No. 29,701 showing a microphone 24 and a photo-electric cell 60 modulating a powerful neon lamp 93 which, in this case, provides an instantaneous light amplification of the order of $10^{10}$ between the light falling on cell 60 and that produced at lamp 93; FIGURE 12 of No. 705,689, showing photo-cell 111 modulating light source 116; FIGURE 4 of 1st addition No. 39,301; the multi-element secondary electron multiplier 7 with multielement photo-electric cell 2 of No. 812,946; FIGURE 3 of addition No. 48,053 showing a multi-elementary light amplifier; and FIGURES 1 and 2 of No. 981,226, showing an application of the control of addition No. 29,701 to a multi-element screen.

Figure 8A:
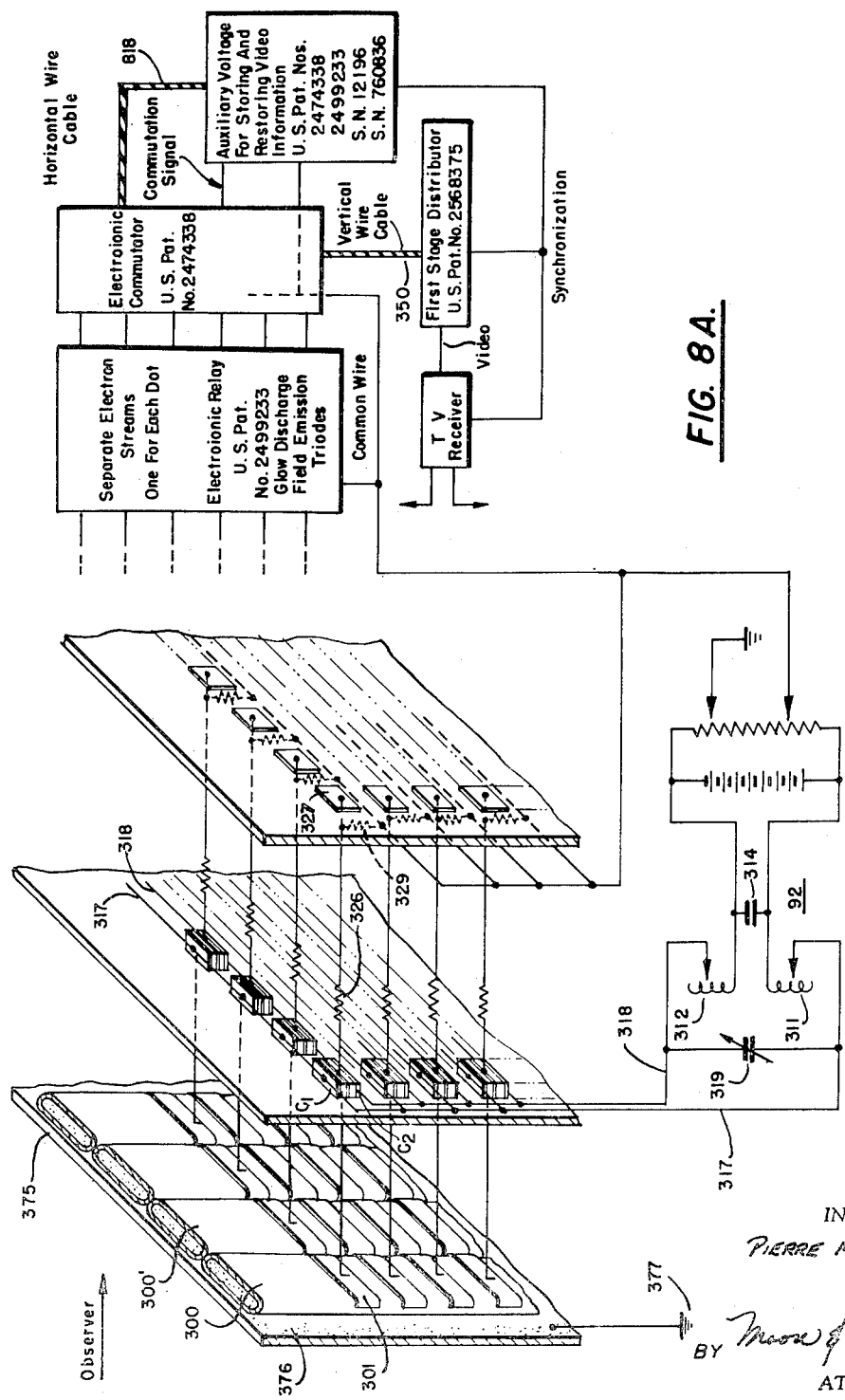
FIGURE 8A is a fragmentary exploded perspective view of one form of composite monochromatic screen incorporating my invention.

FIGURE 8A shows one form of practical construction of television screen according to the arrangement of FIGURE 8. Similar members have been indicated with a subscript so that the relationship of equivalent parts is clear. As shown, the tubes 300 are flattened and adhered to the rear face of a transparent plate 375. Plate 375 is provided with a transparent conducting coating 376 of "Nesa" or the like grounded at 377 which provides one common electrode for all the tubes 300. The ferro-electric condenser $C_1$ and $C_2$ may be made of a single ceramic bar with spaced plates after the manner of FIGURE 8.

The schematic circuit of FIGURE 9 provides for storing and restoring video information or signals in each of the independent condensers 600, also indicated by K, corresponding to each elecrtro-optical element or "dot" of the screen 63. These are, of course, as many similar condensers 600 as there are dots in the picture presented on screen 630. Although conventional radio tubes are shown for simplicity in FIGURE 9, it will be understood that in the preferred form of the invention the field emission diodes and triodes of FIGURE 8 and my related patents are used.

Every thirtieth of a second a periodic charge is placed on representative condenser 600 to a value corresponding to the instantaneous value of the video signal. The condenser 600 is periodically discharged at the end of each cycle. Triodes 601 and 602 are connected in series and supplied by battery 603. Condenser 600 has one terminal connected between the positive terminal of battery 603 and a wire 604 leading to the cathode of tube 602. The other terminal of condenser 600 is connected to the anode of triode 601.

Under normal conditions both tubes 601 and 602 are cut off and made non-conducting by a negative bias on their grids. The grid of storing tube 601 is connected through large resistance 605 to the negative terminal of bias battery 606 and the grid of restoring tube 602 is connected through a similar resistance 607 to the negative terminal of bias battery 608.

Here again an equivalent mechanical commutator arrangement is shown in the drawing for the purpose of showing in a simple and direct manner the cycle of events which in the preferred form of the invention is accomplished by electronic commutation such as shown in the labeled section of FIGURE 11 and in my U.S. Patent No. 2,848,536 and my copending application Serial No. 149,062 referred to above. A synchronous motor 609 is synchronized on the end of line signal from standard receiver 631 by channel 632 and as shown by the dash line 633 operates the three brushes 610, 611, and 612 of the charge, discharge and amplification control, respectively. Brush 610 contacts a small conductive section 613 once every revolution. As there are five hundred twenty-five lines in standard television practice the pitch or circumferential length of segment 613 is one-five hundred twenty-fifth of the circular path covered by brush 610 or approximately 41.2 minutes of arc. Brush 610 receives from first stage distribution 614 the individual video signal or dispersed video information through the corresponding lead of cable 633 for the particular vertical wire of FIGURE 8 to which it is connected. The particular horizontal line energized at any instant is determined by synchronizing signal supplied by wire 632 to synchronous motor 609, the particular picture dot to be modulated being determined by the cross-over point of the particular horizontal line and vertical line concerned of the picture.

In each vertical wire the signals arrive at a rate of $525 \times 30$ per second. Sector 613 is connected to the grid of charging tube 601 during the short interval of contact between brush 610 and sector 613, tube 601 becomes conductive and the current charging condenser 600 is approximately proportional to the video information signal level during the short period. As a result condenser 600 acquires a charge representing the quantity of light of the corresponding elemental area or dot on the picture screen.

As brush 611 rotates it contacts a small sector 615 which is somewhat larger than sector 613, but still occupying a very small segment of arc. As shown in FIGURE 9, sector 615 is phase shifted in advance of sector 613 and a safety zone is provided so that contact 611—615 is always broken before contact 610—613 begins. This relationship will be brought out more clearly in the discussion of FIGURE 10. When brush 611 contacts sector 615 near the end of the cycle, tube 602 becomes conducting and condenser 600 discharges abruptly exponentially.

During the most important part of the cycle condenser 600 is effectively insulated and has a stored charge corresponding to the amount of light to be produced by the dot on the picture screen 630 it represents. As a practical matter the condenser 600 is of very small capacity, less than one micro-microfarad and the voltage across its terminals is correspondingly limited, having a maximum of about twenty volts. However, the ferro-electric modulator and the electro-optical element have a relatively large capacity, e.g. twenty microfarads requiring a few hundred volts, and a stage of amplification is desirable in most cases. Tube 625 having two control grids is provided for this purpose. The internal control grid is connected through large resistor 616 to the negative side of bias battery 617, rendering the tube 625 normally inoperative. Internal control grid is also connected to sector 618 and becomes positive when brush 612 comes in contact with sector 618, placing tube 625 in condition to amplify. The external control grid of tube 625 is connected to condenser 600 and the anode is connected through resistor to battery 620.

Sector 618 is of relatively large size, e.g. nine-tenths of the circumference, and located on the opposite side or out of phase with respect to sectors 613 and 615, so that tube 625 amplifies only during that portion of the time cycle when the charge is stored in condenser 600. The contact 612, 618 is broken and tube 625 is cut off during those short periods during which condenser 600 is being either charged or discharged.

The anode of tube 625 is connected through decoupling resistance 621 to ferro-electric condensers 622 and to the individual elemental area electrode 623 of the gas filled tube 624. A high frequency voltage supply 634 of about twenty kc. provides the A.C. power required to produce modulation of the ferro-electric condenser pair as discussed previously in connection with FIGURES 1–5. A small condenser 619 may be provided to maintain the voltage substantially constant during the short interval during which the anode current of tube 625 is cut off.

In FIGURE 10 is presented a plurality of one form of time cycle of the circuit of FIGURE 9. The curves represent possible successive voltages on the condenser 600 during a cycle. The letters $a$–$f$ on the time graph correspond to the physical events similarly lettered in FIGURE 9. The period $a$–$b$ will be seen to be the storing period during which brush 610 contacts sector 613 and causes tube 601 to conduct, charging condenser 600 according to the video signal information received by the respective wire of cable 633 from first stage distribution 614. At $b$ tube 601 cuts off, isolating condenser 600 with its elemental area light modulating charge. The interval $b$–$c$ is a safety time before the beginning of amplification by tube 625 at $c$. During the interval $c$–$d$ contact is closed between brush 612 and sector 618, shorting out the bias voltage of battery 617 and permitting tube 625 to amplify the signal stored on condenser 600 and provide an amplified light signal voltage to the ferro-electric condenser pair 622 through decoupling resistance 621. It will be noted as one great advantage of the present invention that the elemental area or dot on the screen energized by individual electrode 623 glows at a constant light level determined by the charge on condenser 600 for the entire interval $c$–$d$. The resultant effect is to provide far more light for the production of a picture than is possible with conventional cathode ray scanning techniques. With the same current available, the differential is of the order of magnitude of ten thousand to one, the interval $c$–$d$ being about three-quarters of a cycle while the cathode ray energization lasts about one-two hundred and fiftieths of the time allowed to scan a line.

The interval $d$–$e$ is a second safety zone during which tube 625 is cut off and brushes 610 and 611 are out of contact with segments 613 and 615. At the instant $e$ brush 611 contacts segment 615 causing tube 602 to conduct and the abrupt exponential discharge of condenser 600 during the interval $e$–$f$. Interval $f$–$a$ is a third safety zone during which tubes 601, 602 and 625 are non-conducting and brushes 610, 611 and 612 are out of contact with their respective arc segments.

As shown in FIGURE 10, the cycle starts again with a new video signal charge on condenser 600, which may be the same as before or a different value as the case may be. Where the charge is the same as the previous value as is true ninety percent of the time, the required bandwidth may be reduced by the insertion of a diode or the like 636 in the grid circuit of tube 602 so that tube 602 remains inoperative until the particular video signal from distributor 614 changes value. This technique is disclosed in my copending application Serial No. 409,936 for Television System Having Reduced Transmission Bandwidth, filed February 12, 1954.

FIGURE 11 shows one form of general circuit by which video signals may be supplied to the screen elements. The circuit is divided into sections separated by lines with long dashes for clarity in description. Section 400 in concerned with the reception of television radio waves and first stage distribution of the video signals among the many independent vertical channels 414 which, in the present case, number four hundred fifty and correspond to the number of elemental picture areas or data contained in each horizontal line of the picture in accordance with the technique described in my U.S. Patent No. 2,568,275.

Section 401 is concerned with the second stage of distribution of the video signals on the vertical wires 414 among the individual elemental screen areas or dots in accordance with the technique described in my U.S. Patent No. 2,474,338.

Section 402 provides amplification of the individual video signals for each dot. Reference is made to the technique described in my U.S. Patent No. 2,499,233.

Section 403 is concerned with the use of the amplified D.C. signal in a ferro-electric modulator according to the invention to obtain a high frequency A.C. voltage, e.g. fifty kc., and employs the vridge circuit discussed above for the application of the video signal to elemental portions of a gas filled tube in the manner discussed in connection with FIGURE 8 to cause local excitation of the gas and/or phosphor and produce modulated light for each dot on the screen corresponding to the equivalent dot in the original scene or picture being televised.

Referring to section 400, the very short conventional television waves are received, amplified and selected in the receiver 410 and distributed by end of line channel 411, end of field channel 412 and video channel 413. Sound is included as shown in the drawing. Channel 413 has a conventional bandwidth of 4.2 megacycles and therefore 8.4 millions of units of independent information signals arrive per second. With the present conventional standards in the United States, the end of line frequency is $30 \times 525 = 15{,}750$ c./s., and therefore each horizontal line on the screen may be considered as having five hundred thirty independent dots. However, because of the time normally allowed for the retrace of the beam in standard cathode beam tubes, 15% of the time is lost and only four hundred fifty dots are visible in each horizontal line of the screen. The signals received at very high speed from the single video channel 413 are first distributed cyclically among the four hundred fifty independent vertical channels or wires 414 at the low rate of 15,750 cycles/sec. by means of electronic devices in accordance with my U.S. Patent No. 2,568,735 and indicated generally at 415. Conductors 414 are connected to the "vertical wires" of the screen and the successive video signals transmitted by each of the wires correspond to the quantity of light to be produced by the elemental screen areas located one under the other along a vertical alignment of the screen. The electronic commutator is schematically represented by its mechanical counterpart for simplicity of presentation. The actual mechanical structure shown at 415 is not employed because of the difficulties in making a successful commutator with four hundred fifty segments and a brush rotating at 15,750 r.p.s. Actually, the distriubtion is obtained without moving parts by my U.S. Patent No. 2,568,735.

Each channel 414 is provided with a storage condenser 404 and the video signals are maintained at constant level until the arrival of a new signal in the same channel. As a result, the video signal level for each channel 414 is maintained at its respective value for more than three-quarters of the time interval between successive signals on each channel 414. Therefore, video signals are being effectively supplied to the screen at their respective levels, simultaneously by more than half the channels 414 during an appreciable time, e.g. ¼ of a cycle $$\frac{1}{(4 \times 15{,}750 \text{ sec.})}$$

permitting the second step distribution at relatively very low speed.

In section 401 the video signals arriving at the rate of 15,750 c.p.s. in each wire 414 are redistributed among the independent horizontal elements on the screen by means of air field emission glow discharge diodes 405 in accordance with my U.S. Patent No. 2,474,338. Although the term glow discharge diode is used to identify the elements 405, they are in fact electro-ionic "commutators" employing field emission in open air at room pressure.

Each of these air diodes 405 comprises a needle 416, facing two symmetrical wire electrodes 407 and 408 and one is provided for each dot on the screen. As shown in FIGURE 8A their construction can be very cheap when produced side by side on a continuous sheet. In large area screen construction the sheets comprise removable squares forming a checkerboard mosaic, each having 2500 elemental areas or dots and a diode 405 for each dot. A screen of 100 tiles would be about 10 feet square.

Each electrode wire 408 connects all the air diodes 405 in vertical alignment on the screen as suggested by slanted dotted arrows which may be thought of as in perspective. Each independent electrode 407 is connected by a very small conductor 421 to the control grid 420 of the facing air discharge field emission triode 470 constructed in accordance with the technique described in my U.S. Patent No. 2,499,233. There again as many glow discharge field emission triodes 470 are provided as there are dots on the screen and they are constructed in the manner described above. Again, dotted arrows are used to show signal transfer. They are combined in each tile with their respective air diodes. Each small wire 421 is coupled by a small capacity 423 to a horizontal conductor 422. The horizontal wires 422 receive in turn 30 pulses per second, each having a duration of about one quarter of a line scanning period, $$\frac{1}{4 \times 15{,}750 \text{ sec.}}$$

In FIGURE 11, horizontal wires 422 are shown connected to a mechanical commutator 447, which provides the pulses just mentioned. Here again the mechanical counterpart is shown in place of my electronic commutator, disclosed in application Serial No. 12,194, filed February 29, 1948, for "Process for Obtaining Voltage Impulses Spaced Out in Several Conductors," and U.S. Patent No. 2,568,735. In the basic schematic system shown in section 401, a condenser 434 is periodically recharged at a low rate by D.C. supply 435 through resistor 436. Condenser 434 is discharged rapidly into each of the horizontal wires 422 in turn by the commutator 437. The number of commutator sectors is twice the number of horizontal lines to be scanned (2×525) because there are twice as many wires 422 as there are lines on the screen. Here again, the purpose is to permit the alternate storing of video signals in all the electro-optical elements or dots of half the screen at a time, e.g. on the left and then on the right half, each half being served by one of the two horizontal wires 422. This alternate operation is necessary because the video signals arriving from the first stage distributor 415 are progressively time-phase-shifted along the horizontal line of the picture.

The amplitude of the pulses applied to each of the wires 422 is carefully controlled at a constant maximum value. Each pulse induces in the small conductors 421 a pulse of a pre-determined signal amplitude through coupling condensers 423, causing instantaneous video signal storage at air discharge diodes 405. Commutator 437 is driven by a motor 438 synchronized on the end of field channel 402 which therefore revolves at 30 r.p.s.

Where conventional interleaved field scanning is used every other commutator sector is connected in succession to every other wire 422 of the even field, and the remaining sectors to every other horizontal wire 422 of the odd field. Another synchronized motor 419 drives a commutator 439, having sectors 440 and 442 connected across batteries or similar supply 441 and 443 each of 6,000 volts. Wire 423 connects commutator 439 to the needles 442 of diodes 405 and applies +6,000 volts, −6,000 volts and 0 voltage thereto in succession. When +6,000 volts is applied to needle 442, the video signal remaining on electrode 407 and conductor 421 connected thereto is erased. When −6,000 volts is applied, the electro-ionic diode 405 is prepared to receive and store the new video signal because it will conduct in the proper direction. At this instant current flows to electrode 408, but none flows to electrode 407 until the potential of electrode 407 is suddenly changed by the impulse supplied by the corresponding horizontal wire 422, coupling condenser 423 and wire 421. On the arrival of the pulse at electrode 407, a current flow occurs between needle 416 and electrode 407 until the potential on the electrodes 407 and 408 are equal and therefore correspond to the instantaneous voltage determined by the dispersed video signal applied to the vertical wire 414. As a result, each electrode 407 is supplied with a potential corresponding to that on its respective vertical wire 414 at this instant. The wires 421, corresponding to each dot on the screen along a particular horizontal line of the picture, consequently receives voltages in accordance with the light level of the data to be reproduced. The glow discharge diodes are thus able to control storage of the instantaneous voltages of all the individual vertical wires. The result may be compared with an "instantaneous printing" along an entire horizontal line of all the light values represented by the various voltages on the 450 vertical wires 414. A line is then skipped where conventional scanning is employed and the next or third line is reproduced or "printed" with all the light values represented by the various new voltages on the vertical wires 414 at the later instant. Because two wires 422 are employed for each picture line, the above "printing" occurs alternately on each half of the picture. It will be seen that at any time all of the wires 421 have a potential corresponding to the light level of the respective dot or elemental area of the actual scene being televised which they individually represent, except in that small portion of the screen where the signal has been erased and a new signal is awaited.

Section 402 provides for the amplification of the small voltages on wires 421 and the very small charge stored therein. The capacity of wire 421 is of the order of one $\mu\mu f$. These voltages are amplified individually in each glow discharge or air field emission triode 420. Each triode 420 comprises a needle 425, a control grid 409 and a plate 416 with a plate resistor 417 connected to a common D.C. supply 418 of 2,000 volts. Needles 425 are connected in parallel to the brush of commutator 430 which applies voltages of plus or minus 6,000 volts, or zero voltage thereto. Commutator 430 is driven by the same motor 419 as commutator 439, and is synchronized with the end of field signal. Sector 427 is positioned so that its circuit is closed when the circuit of commutator 439 is open. Therefore, there is no voltage on needle 425 of triode 420 during the time of erasing and storing of information on wire 421. After the new video signal has been received and stored by conductor 421 and applied to control grid 420, the −6,000 volts from battery 419 is applied to needle 425 which cause triode 470 to conduct and amplify the video signal, during three-quarters or more of the cycle. Current of the order of one micro-ampere and potentials as high as a thousand volts can be obtained in the output circuit of plate 426, while the controlling voltage on wire 421 is only about ten or twenty volts.

It should be noted that sections 401 and 402 would require no more than about twenty phase-shifted commutators 430 and 439. The scanning of all lines of a field is not simultaneous, but the high voltage can be applied to the needles a little before or after the appropriate times. It will be understood that electronic commutation will be employed. The mechanical showing, while equivalent, is used primarily for illustration.

Section 403 shows the connection of the structure of FIGURES 6 or 7 to the outputs of the amplifier section 402. A wire containing decoupling resistor 443 connects the plate 426 of triode 470 to the middle lead of a pair of ferro-electric condensers 444 and 445 which correspond to their counterparts shown in FIGURES 6, 7, 8 and 9. The terminal leads 446 and 447 of the aligned pairs of condensers 444, 445 are connected in parallel and supplied by an oscillating circuit 448 at a frequency of the order of twenty to fifty kc., from a powerful oscillator, similar to the circuits of FIGURES 7 and 8. A ferro-electric bridge circuit is formed, as explained above. The amplitude of the high frequency voltage appearing at electrode 449, connected to the middle lead of paired condensers 444—445, is a function of the amplitude of the D.C. voltage supplied from plate 426. Each electrode 449 represents an elemental area or dot on the screen and the light produced by the local excitation of the phosphor is a function of the corresponding video signal on wire 413.

FIGURE 11A shows one form of electronic commutation circuit for replacing the mechanical commutator 430 and is included by way of example for the substitution of electronic commutation for all the mechanical commutators. A double throw double pole switch 490 shows the connections by which the electronic commutation of FIGURE 11A may be substituted for mechanical commutator 437 and vice versa. When the middle movable member of switch 490 is thrown to the right, the mechanical commutator 437 functions and when thrown left the electronic commutator of FIGURE 11A functions. Commutation is obtained by two gas filled thyratrons 475 and 476 connected in series and fired alternately. The end of the field signal is connected to synchronize a small oscillator 477, the output of which is used to generate two phase-shifted alternating currents of the same frequency. Phase-shift is obtained by inductance 478 and capacitance 479 which are variable. The grids of thyratrons 475 and 476 are normally negatively biased by battery 480 and are supplied in addition with the secondary voltage of small transformers 481 and 482. The grids become positive for only a short period of time, during which the thyratrons are conducting. Adjustment of inductance 478 and capacitance 479 permits regulation of the firing time. Both thyratrons are supplied in series by D.C. voltage 483. When thyratron 475 is conducting and 476 is non-conducting, junction 484 is at the same potential as lead 485 on battery 483. When the thyratrons are reversed in action, junction 484 is at −6,000 volts. The potential difference between wire 485 and junction 484 varies from zero to −6,000 volts cyclically in synchronism with end of line signal and provides the pulse train discussed above in connection with mechanical commutators 430. A condenser 486 causes abrupt extinction of the thyratrons giving a sharp rectangular pulse output.

It will be understood that a circuit similar to that of FIGURE 11A or identical therewith, except for the circuit constants, is preferably used instead of the other mechanical commutators of any of the figures of the drawing.

FIGURE 12 shows an adaptation of the present invention to one form of color television tube in which the various color elements are on the same line normal to the plane of the picture rather than side by side. An observer positioned on the right sees light from a given elemental screen area as green, blue or red, as the case may be, at a given instant. An instant later the same elemental area may be an entirely different color.

A color television receiver screen 500 is made up of a series of elongate tube elements each having a series of elemental portions energized by condenser elements as described previously with the difference that the array of tubes is three deep, one layer for each color, making three times as many tubes and elemental areas as in the black-and-white or monochromatic receiver.

An outer tube element 501 is filled with argon or nitrogen at low pressure capable of producing ultraviolet light which penetrates the tube walls and energizes two transparent layers 502 and 503 of phosphor capable of furnishing green light of a desired saturation. Front phosphor layer 502 is covered by a transparent conducting coating 504 of acidified gelatin or plastic material. A similar layer or transparent conducting coating 505 covers the rear phosphor layer 503. Coating 505 may take the form of lead glass with the acidified gelatin applied thereto, if desired. The conducting coating 505 is grounded at 506 by connecting wire 507.

A second tube 508 transparent to ultraviolet is likewise filled with nitrogen at low pressure and is coated on the outside with transparent layers 509 and 510 of a phosphor yielding blue light. Phophor layers 509 and 510 are covered respectively with transparent conducting layers of acidified gelatin 511 and 512 which correspond to coatings 504 and 505 of tube 501. Layer 512 is also grounded at 506 through wire 507. Coatings 505 and 511 are preferably separated by an air gap of two to four mils as at 513.

The third tube 514 is filled with neon at low pressure giving an orange light. Tube 514 has a transparent conducting coating 515 of acidified gelatin on its forward side and a reflecting conducting coating 516 of metallic silver, nickel, chromium or the like metal foil, metallic paint, or similar material which is grounded at 506 by wire 507. A red optical filter 517 which passes red only and gives high saturation is positioned between the two conductive coatings 512 and 515.

The signal supply circuit for the color tube 500 comprises the double condenser and air field emission technique discussed above. Three double condensers 518, 519 and 520 have their outer plates connected in parallel by wires 521 and 522 which are connected across a fifty kc. oscillator 523 which supplies all the dots or elemental picture areas as previously discussed.

The central common plate of condenser 518 is connected to junction 523 with wire 524 which is the green control electrode leading from transparent conducting coating 504. Junction 523 is connected to the plate of air field emission glow discharge triode 525 through decoupling resistor 526. Plate resistor 527 is connected to junction 523 and to wire 528 leading to the positive terminal of a 2,000 volt D.C. source 529.

In the same manner, the middle plate of double ferro-electric condenser 519 is connected to a junction 530 to which is connected the blue electrode 531 leading from transparent conducting coating 511. Triode 532 has its plate connected to junction 530 through a decoupling resistor 533 and the plate resistor 534 connects junction 530 and wire 528 leading to the positive D.C. source. The middle plate of ferro-electric double condenser 520 is connected to junction 535 with the red electrode 536 leading from transparent conducting coating 515. A plate resistor 539 connects junction 535 and wire 528 leading to D.C. source 529. The plate of triode 537 is connected to junction 535 through decoupling resistor 538.

The glow discharge triodes 525, 532 and 537 are each provided with an accelerating electrode 539 connected by a wire 540 to the negative side of 2,000 volt D.C. source 529. Electrode 539 may be thought of as essentially part of the cathode in this type of air field emission glow discharge triode, as explained in detail in my U.S. Patent No. 2,474,338 et al. The needles 541 are connected to the negative side of 6,000 volt D.C. source 542 by wire 543. The positive terminal of D.C. source 542 is connected to wire 540.

The glow discharge triode 525 has a glow discharge diode 544 which operates as shown in FIGURES 4a and 4b of U.S. Patent No. 2,474,338 and in FIGURES 8 and 11 of the present specification. Vertical wire 545 carries the green video signal. Independent electrode 546 is connected to the control grid of triode 539 and needle 547 is connected to the negative side of 6,000 volt D.C. source 542 by wire 543. In the same manner, glow discharge triode 532 is supplied with a diode 548 comprising vertical wire 549 carrying the blue video signals and triode 537 has diode 550 with vertical wire 551 carrying red video signals associated with it.

Glow discharge diodes 544, 548 and 550 function as do their counterparts in FIGURES 8 and 11 and as described in my patents referred to above. It will be seen that the structure of FIGURE 12 requires three independent signal distributing systems, one for each color, green, blue and red. There is, however, only one generator of peak pulses phase-shifted from each other as the three systems are in parallel. In the form shown there are five hundred green tubes 501 with an individual green signal terminal or electrode 524. The same is true of blue tube 508 and blue electrode 531 and for red tube 514 and red electrode 536.

Vertical wires 545, 549 and 551 correspond in function to conductors 19, 19', 19", 19"' of FIGURE 2 of U.S. Patent No. 2,474,338 except that they carry color signals.

The large wall-type color screen 500 is made up of 1500 small tubes, the front five hundred of which correspond to tube 501. They are transparent and emit a green light when energized. The layer of five hundred tubes 508 just behind are also transparent and when energized emit a blue light which can be seen clearly through the first or green layer. In the rear is a third layer of five hundred tubes 514 which, when energized emit a red light which is visible through the first two layers. Behind the tube layer are located the glow discharge diodes and triodes, as shown in FIGURES 8 and 11 and described in my U.S. Patent Nos. 2,474,338 and 2,499,233. A standard color television receiver, minus the usual horizontal and vertical sweep circuits, supply the picture signals on wires 545, 549 and 551.

FIGURE 13A illustrates the conventional scanning method with a simplified screen containing three dots of the usual four hundred in horizontal lines and only two lines for each of the two interlaced fields, instead of 480 lines of a conventional five hundred twenty-five-line standard. In this conventional method, the even lines are scanned continuously during the first field scanning and the odd lines in the course of the next field presentation. It may be shown that a discontinuous picture structure in the vertical direction and a continuous horizontal picture structure is no more desirable than the square dot pattern used in the normal printing operations in half-tone or similar reproduction methods. The results obtained with three square picture elements per line are more pleasing than if the lines are continuous. FIGURE 13 shows how the dot interlaced method of scanning works. There are now forty-eight dots in the screen instead of twelve and these forty-eight dots are presented in the course of eight successive field scans, each scan presenting six dots. The light of each dot is maintained permanently from the time the dot receives one piece of information until the next piece of information is presented to it, eight fields later. Thus, the flicker is substantially negligible. In FIGURE 13, the first field is represented by the dots 107, 108, 109, 110, 111, and 112, etc., until the eighth field occurs represented by dots 143, 144, 145, 146, 147 and 149. After this, a new scanning cycle begins again.

The same FIGURE 13 illustrates in block schematic, the general circuitry required. The radio waves are received, amplified and detected and the audio and video and synchronizing channels are separated in the conventional manner. The video information is distributed across the surface of the screen by means of non-moving electronic devices disclosed in my U.S. Patent No. 2,568,375 and in FIGURE 11A. A rotating brush driven by a synchronizing means is successively brought into contact with the forty-eight contacts, each connected to a dot of the picture. For simplicity, only one connection has been shown for each group of three horizontal dots.

The present invention is particularly adaptable to color television employing the dot interspersed scanning technique, disclosed in my U.S. Patent No. 2,479,880 and copending applications Serial Nos. 126,820; 261,471; 172,320 and 149,062, because each video signal is stored in a condenser K and is available to maintain the dot illumination level for a very large part of the time between successive scannings of the same dot. By this technique the scanning rate may be very low without flicker and it is possible to decrease the dot size and increase the number of effective dots by a factor of four.

In FIGURE 13A four line sections represent the four hundred eighty lines of a picture. In conventional scanning the odd lines of the picture, which are shown cross-hatched, are scanned in the course of one field and the even lines are scanned in the course of the following field. In FIGURES 13 and 13A the first line is indicated with only three representative dots as shown by the large squares. According to the dot interspersed technique each of these large squares is divided into four parts or small dots. Each small dot corresponds to an elemental area of only one-quarter of the size of the old conventional dot.

Instead of a continuous scanning, the dots scanned in succession are interspersed. In the course of the first field scanning of the odd lines the first dot in the upper left of each square is used, that is, dots 101, 102, 103, etc. are scanned in succession for the first horizontal line scanning, and dots 104, 105, 106 are scanned for the second horizontal scanning. The dots 101 and 102 are separated horizontally by two units and the dots 101 and 104 are separated vertically by four units.

In the course of the second field scanning the dot in the upper left of the even square is used and the dots 107, 108, 109 are scanned for the first horizontal scanning and dots 110, 111, 112 are scanned for the second scanning.

Then the dot located in the opposite diagonal of each square is used and the dots 113, 114, 115 are scanned for the first scanning and the dots 116, 117 and 118 are scanned in the second scanning. After this scanning of the odd field the even field is scanned and the dots 119, 120, 121 are used in the course of the first scanning, and the dots 122, 123, 124 are used in the course of the second scanning. Half of the dots of the screen have been used. Now another dot of the square is used, namely the dot bottom left is used. The dots 125, 126, 127 are scanned in course of the first scanning, then the dots 128, 129, 130 in the course of the second scanning.

In the course of the odd field scanning dots 131, 132, 133 are used for the first scanning, and dots 134, 135, 136 in the course of the second scanning.

Then the dots located upper right in each square are used. For the odd field dots 137, 138 and 139 are scanned in the course of the first scanning and dots 140, 141, 142 in the course of the second scanning. For the even field scanning dots 143, 144, 145 are used for the first scanning, and dots 146, 147, 148 for the second scanning.

FIGURE 13B shows the respective location of one arrangement of dots receiving video information in the course of the eight successive field scannings. In conventional television the rate of scanning is 2×30 fields per second. With this new dot interspersed technique, a cycle of eight field scannings at the rate of 7.5 fields per second is used. Since the light is maintained in each part of the luminescent tube, no flicker exists and it is possible to reduce the rate of scanning to 7.5 per second.

The block diagrams of FIGURE 14 show a three-color television system according to the invention and embodying my other inventions.

According to NTSC standards a burst signal indicates the end of line and it is employed to synchronize a local oscillator providing a sub-carrier reference frequency. The complete video bandwidth is detected to obtain the "transparency" channel while a part of the high frequency components are employed to separate the individual color signals. For this purpose the sub-carrier frequency is utilized to operate two detectors phase shifted ninety degrees and the "line" and "saturation" channels are obtained for the color information. These signals are combined with the transparency channel signals in a matrix system to extract the three primary colors: the red video channel 805, the blue video channel 806 and the green video channel 807. This technique is described in detail in The Proceedings of the I.R.E. for October 1951 and January 1954 and the references there cited.

The end of line frequency, 15,750 cycles/sec., is used to synchronize the frequency multiplier 808 and the corresponding frequencies are used to distribute the video signals among the many vertical wires 350 of which there are about four hundred fifty for each color.

The distribution is made in two steps; the video signals arriving at very high speed ($2 \times 4 \times 10^6$ when the bandwidth is four megacycles) are first distributed into eight intermediate channels 812 for each color. In each of the channels the rate of signal arrival is about a million/sec. Each channel is amplified in amplifier 811. Each intermediate channel is used again to supply sixty vertical wires in which the rate of signal arrival is 15,750/sec. The amplified signals from the first stage distributor 809 is amplified at 811 and supplied to second stage distributor 810. To operate the second stage 810 a generator 813 of phase-shifted pulses is provided in accordance with the disclosure of my U.S. Patent Nos. 2,685,644 and 2,685,103. Signal distribution for the above purpose is further discussed in my copending U.S. Patent No. 2,848,536.

Frequency multiplier 808 supplies four reference frequencies to oscillator 814 which are phase-shifted at 813 by zero degrees and ninety degrees and amplified.

The end of line signal is used to synchronize an ignition device 815 comprising a group of thyratrons, and a mechanical commutator 816 as disclosed in Serial No. 12,194. The ignition pulses are multiplied at 817 as taught in Serial No. 760,836 to supply horizontal conductors which number twice the number of horizontal lines of the picture. In each of these channels the pulses are phase-shifted. The horizontal wires are connected to condenser R in FIGURES 8 and 9. The stub horizontal wires are shown projecting from 328 in FIGURE 8 and at 818 in FIGURES 8A and 14.

While there have been described above what are at present believed to be the preferred forms of the invention, other forms will suggest themselves to those skilled in the art. All such variations as fall within the true spirit of the invention are intended to be covered by the generic terms of the claims set forth below.

I claim:

1. In combination in means for modulating a light source, a pair of condensers at least one of which comprises ferro-electric material and having a common junction, means to apply a voltage across said condensers and means to vary the relative capacity of said condensers constituting said pair whereby a modulated voltage appears at said common junction.

2. The combination set forth in claim 1, a light source, means for connecting said light source to said common junction.

3. The combination set forth in claim 2, said light source comprising a glow discharge tube.

4. The combination set forth in claim 2, said light source having a plurality of electrodes thereon and a pair of said condensers each having their common junction connected to at least one of said electrodes.

5. The combination set forth in claim 4, a plurality of groups of said light sources, each group comprising material producing a distinctive color when energized by the voltages modulated by said pair of condensers.

6. In combination, a light source comprising a surface comprising a plurality of elemental areas, a pair of condensers at least one of which comprises ferro-electric dielectric material, a common junction for said pair, the number of said pairs corresponding substantially to the number of said elemental areas comprising said light source, an electrode adjacent each elemental area, circuit means connecting each electrode with the said common junction of a corresponding condenser pair, means to apply a voltage across said condenser pairs and means to vary the relative capacity of the condensers constituting a pair whereby modulated voltages appear at said terminals for producing modulated light at said elemental areas comprising said surface.

7. A modulated light source comprising means for producing light in response to an applied potential, means to apply a variable potential to said means, a ferro-electric condenser bridge comprising a pair of condensers having a common junction, at least one of said condensers comprising a ferro-electric dielectric, said common junction being connected to said second named means, means to supply video signal information to the junction of said condenser pair, means to apply opposed alternating voltages across said condenser pair in series, means to superpose direct current voltage across said condenser pair in series and means to vary said direct current voltage.

8. The combination set forth in claim 7, said light source comprising a screen having a large number of elemental light producing areas, each area having a corresponding condenser bridge and means to apply a variable potential thereto, said elemental areas comprising a plurality of groups, each group comprising material producing a distinctive color when subjected to a potential of sufficient value.

9. The combination set forth in claim 1, a light source in the circuit comprising said condensers, said modulated voltage appearing across said source and modulating the light emitted thereby, said light source comprising a panel having a phosphor coating positioned for activation by said modulated voltage.

10. The combination set forth in claim 1, said light source comprising a flat tubular structure having an ionizable gas therein.

11. The combination set forth in claim 1, said light source comprising a panel comprising a plurality of layers of light producing material.

12. The combination set forth in claim 11, each said layer containing material for producing a different colored light and having at least one individual pair of said condensers connected for individual control of the different colors by said means to vary the relative capacity whereby a desired blend of colors can be achieved.

13. The combination set forth in claim 1, said means to vary the relative capacity of said condensers comprising at least one operative control means so constructed and connected that the entire effective light producing area of said source may be modulated as a whole to desired light level.

14. In combination in means for varying the intensity of a light source comprising a source of controlling signal voltage, a source of alternating voltage, a resonant circuit comprising means to vary the resonant frequency thereof to affect the intensity of light produced by said source, means to combine said controlling signal voltage and said alternating voltage to produce a resultant variable voltage, a light source responsive to said resultant variable voltage and coupled to receive said resultant variable voltage to energize and to modulate said light source.

15. The combination set forth in claim 14, said source of controlling voltage comprising a transducer, said resonant circuit comprising an inductance and capacitance connected in series, said transducer comprising means to amplify a signal, said means to amplify comprising a glow discharge triode and said resonant circuit comprising ferroelectric material.

16. In combination in a device for modulating a light source, plural element means exhibiting domain structure hysteresis and comprising a common portion joining at least two elements of said means exhibiting domain structure hysteresis, means to apply an input signal voltage to at least one of said elements of said plural element means, means to apply a voltage for energizing said plural element means, and means to provide a light modulating output from the combination comprising a light source.

17. The combination set forth in claim 16, said plural element means comprising a pair of condensers at least one of which comprises ferro-electric material, said means to apply an input signal voltage being connected to said common portion and said means to apply said energizing voltage being connected across said condenser pair in series said light source being connected to said common portion.

18. The combination set forth in claim 16, a light source, said light source comprising an extended substantially flat surface having a fluorescent coating arranged to be affected by said signal output whereby light of desired level is produced by said coating.

19. In combination in a device for modulating a light source, a signal responsive light producing element, voltage drive means coupled for supplying a light producing voltage for said element, impedance balancing means having two elements coupled for controlling the effective value of said light producing voltage applied to said light producing element, signal input means coupled to affect the impedance balance of said two elements of said impedance balancing means, whereby to change the balance and thereby the effective impedance of said impedance balancing means to modulate the light producing voltage applied to said light producing element for modulating the light produced by said light producing element in accordance with a signal input.

20. The combination set forth in claim 19, said impedance balancing means comprising material having domain structure hysteresis and constructed to minimize the light produced by said light producing element when the impedance balancing means is in balance.

21. The combination set forth in claim 20, said impedance balancing means comprising a pair of ferro-electric condensers having a common junction connected to said signal input means, said voltage drive means being connected across said condensers, said condensers having the same impedance with zero signal input and differing impedances, with signal input of finite amplitude, the difference increasing as signal amplitude increases, said impedance difference acting to unbalance said condenser pair and to produce a resultant modulated light producing voltage at said common junction, condenser means coupled with said light source for the application of modulated light produciing voltage to said light element and circuit means connecting said last named condenser to said common junction.

References Cited in the file of this patent

UNITED STATES PATENTS

| | | |
|---|---|---|
| 2,109,540 | Leishman | Mar. 1, 1938 |
| 2,117,544 | Coustal | May 17, 1938 |
| 2,616,962 | Jaffe | Nov. 4, 1952 |
| 2,644,113 | Etzkorn | June 30, 1953 |
| 2,684,450 | Mager | July 20, 1954 |
| 2,715,153 | Sziklai | Aug. 9, 1955 |
| 2,813,229 | Sacks | Nov. 12, 1957 |

FOREIGN PATENTS

| | | |
|---|---|---|
| 204,854 | Australia | May 26, 1955 |

OTHER REFERENCES

Ser. No. 108,062, Toulon (A.P.C.), published May 19, 1943.

Philosophical Mag., October 1947, pp. 700–702, 711–713 and 723, by Destrian.